United States Patent
Trznadel

(10) Patent No.: US 11,439,142 B2
(45) Date of Patent: Sep. 13, 2022

(54) HUNTING TREE STAND ADJUSTMENT DEVICE AND A METHOD OF USING A HUNTING TREE STAND ADJUSTMENT DEVICE WHEN HUNTING IN A CLIMBING TREE STAND

(71) Applicant: Justin Trznadel, North Irwin, PA (US)

(72) Inventor: Justin Trznadel, North Irwin, PA (US)

( * ) Notice: Subject to any disclaimer, the term of this patent is extended or adjusted under 35 U.S.C. 154(b) by 465 days.

(21) Appl. No.: 16/695,763

(22) Filed: Nov. 26, 2019

(65) Prior Publication Data

US 2020/0163325 A1 May 28, 2020

Related U.S. Application Data

(60) Provisional application No. 62/772,409, filed on Nov. 28, 2018.

(51) Int. Cl.
*A01M 3/02* (2006.01)
*A45F 3/26* (2006.01)
*A63B 27/02* (2006.01)
*A01M 31/02* (2006.01)
*E04H 15/00* (2006.01)

(52) U.S. Cl.
CPC .............. *A01M 31/02* (2013.01); *A45F 3/26* (2013.01); *A63B 27/02* (2013.01); *E04H 15/001* (2013.01); *Y10S 135/901* (2013.01)

(58) Field of Classification Search
CPC .......... A01M 31/02; A45F 3/26; A63B 27/02; E04H 15/001; Y10S 135/901

USPC .......................................... 182/133, 136, 187
See application file for complete search history.

(56) References Cited

U.S. PATENT DOCUMENTS

| | | | |
|---|---|---|---|
| 2,380,352 A | 7/1945 | Williams | |
| 3,078,951 A * | 2/1963 | Schneebeli | A63B 27/02 |
| | | | 182/221 |
| 3,444,963 A | 5/1969 | Davis | |
| 4,261,138 A * | 4/1981 | St. George Syms | A47G 33/12 |
| | | | 47/40.5 |
| D269,495 S | 6/1983 | Finn | |
| 4,427,092 A | 1/1984 | Tentler | |
| 4,597,473 A | 7/1986 | Peck | |
| 4,881,293 A | 11/1989 | Reynolds | |
| 4,890,694 A | 1/1990 | Williams | |
| 5,069,310 A | 12/1991 | Barron et al. | |

(Continued)

*Primary Examiner* — Robert Canfield
(74) *Attorney, Agent, or Firm* — Myers Duffy Dansak & Clegg LLC

(57) ABSTRACT

A hunting tree stand adjustment device and a method of using a hunting tree stand adjustment device when hunting in a climbing tree stand. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 24 Drawing Sheets

(56) References Cited

U.S. PATENT DOCUMENTS

| | | | |
|---|---|---|---|
| 5,086,874 A * | 2/1992 | Treants | A01M 31/02 |
| | | | 182/136 |
| 5,492,198 A * | 2/1996 | Williams | A45F 3/26 |
| | | | 182/136 |
| 5,562,180 A | 10/1996 | Herzog et al. | |
| 5,628,383 A * | 5/1997 | McIntyre | A45F 3/26 |
| | | | 182/135 |
| 6,308,800 B1 * | 10/2001 | Graham, Jr. | E06C 1/34 |
| | | | 182/136 |
| 6,345,690 B1 * | 2/2002 | Morris | A63B 27/00 |
| | | | 182/136 |
| 6,568,505 B1 * | 5/2003 | D'Acquisto | A01M 31/02 |
| | | | 182/136 |
| D477,672 S | 7/2003 | Opeka | |
| 6,588,440 B2 | 7/2003 | Varnado | |
| D493,408 S | 7/2004 | Chrisco et al. | |
| 7,958,968 B1 | 6/2011 | Stabler | |
| D656,882 S | 4/2012 | Beranek et al. | |
| 8,381,876 B1 | 2/2013 | Darden | |
| 8,794,384 B1 | 8/2014 | Holford | |
| 9,357,762 B2 | 6/2016 | Dorrity | |
| 9,616,295 B2 | 4/2017 | Mëller | |
| 9,737,070 B1 * | 8/2017 | Quiring | A63B 27/00 |
| 2017/0211904 A1 * | 7/2017 | Matthews | F41A 23/02 |
| 2021/0076666 A1 * | 3/2021 | Power, II | F16B 2/08 |

\* cited by examiner

HUNTING TREE STAND ADJUSTMENT DEVICE AND A METHOD OF USING A HUNTING TREE STAND ADJUSTMENT DEVICE WHEN HUNTING IN A CLIMBING TREE STAND

BACKGROUND

1. Technical Field

This application relates to a hunting tree stand adjustment device and a method of using a hunting tree stand adjustment device when hunting in a climbing tree stand.

2. Background Information

Background information is for informational purposes only and does not necessarily admit that subsequently mentioned information and publications are prior art.

Hunting tree stands, or simply tree stands, are devices used in hunting. For tree stand users, who are, generally, hunters who hunt their game in a wooded area, using a tree stand has significant advantages. A tree stand can allow a hunter to shoot at a variety of angles at a targeted game animal, thereby assisting the hunter in achieving a successful shot. Tree stands are generally fastened or secured around the trunk of a tree at a desired height above the ground.

There are generally two types of tree stands, specifically hang-on tree stands, also known as permanent tree stands, and climbing tree stands. Hang-on tree stands are known as permanent tree stands because they are installed in a tree once and then left there by the hunter. The hunter can then return to the tree stand at that location over multiple hunting sessions, though he can ultimately remove the permanent tree stand when he wants to set it up in a different tree. Climbing tree stands are, in a sense, non-permanent tree stands, as the hunter will remove the climbing tree stand and carry it away at the completion of each hunting session.

Both types of tree stands include a seat portion and a substantially larger platform portion. Once installed in a tree, a hunter can stand on the platform portion in a standing position, and optionally additionally can use the seat to sit in a sitting position with the hunter's back against the tree. Other differences between the two types of tree stands are the exact design and how they are installed in a tree.

Regarding the design differences, the hang-on tree stand is a single mechanism, wherein the seat portion and the platform portion are connected to a single frame. In contrast, a climbing tree stand is made up of two separate, unconnected parts, specifically the seat portion and the platform portion.

Regarding the installation differences, the hang-on tree stand is installed in a tree by the hunter carrying the hang-on tree stand up a separate climbing device or arrangement, such as steps or climbing sticks, which act like a ladder of sorts. The climbing device can be portable and temporarily attached to a trunk of a tree, or can be screwed or inserted into the trunk of the tree. Once the hunter has climbed the climbing device to a desired height in the tree, the hunter affixes or attaches the hang-on tree stand to the trunk of the tree. Since the hunter is standing on the climbing device, the hunter is free to adjust and re-adjust the positioning of the hang-on tree stand as necessary. In contrast, a climbing tree stand is installed in a much different manner. No climbing device or similar structure is used as is with a hang-on tree stand. As the name implies, with a climbing tree stand, the hunter literally uses the climbing tree stand itself to climb the tree without any other supports or climbing devices.

To further explain, each of the seat portion and the platform portion has a similar design for attachment to the tree trunk. Each has a support frame and a strap device connected thereto. The support frame has a first, bracing, section that rests against the tree trunk when installed. The support frame has a second, free, section that includes its corresponding seat or foot platform. The strap device is connected to the free section. To install each of the seat portion and the platform portion, the hunter places the bracing section against the tree trunk and then wraps the strap device around the tree trunk. The free section is kept from pivoting downwardly by gravity by the strap device, while the bracing section presses against or digs into the tree trunk, depending on the design, to form a stable support device that is capable of supporting a hunter thereon.

Once the seat portion and the platform portion are installed on the tree trunk, the hunter can then step up onto the platform portion to begin an ascent up the tree to a desired height. The climbing process begins by the hunter locking his feet into the platform portion, grasping the seat portion with his hands, leaning forward and placing his torso onto the seat portion such that the hunter's weight is supported solely on the seat portion, and finally lifting and sliding the platform portion a distance up the tree trunk using solely the hunter's legs and feet. Once these steps are completed, the platform portion and the seat portion are much closer together. The hunter then stands on the platform portion at its new height, grasps the seat portion with his hands, then lifts and slides the seat portion a distance up the tree trunk to a position near the hunter's torso. The hunter then repeats these two processes, alternately moving the seat portion and the platform portion, until the hunter reaches the desired height on the tree.

With any tree stand, setting the proper position of the tree stand is very important for the safety of the hunter, as well as for an enjoyable and successful hunting experience. Ideally, the seat portion and, more importantly, the platform portion of the tree stand should be positioned generally perpendicular to the tree trunk and, more importantly, generally horizontal or generally parallel or generally level with respect to the ground. If the seat portion is not level, that is, tilted upwardly or downwardly with respect to horizontal or level, then the hunter will or may have difficulty sitting comfortably, which is a problem if the hunter is sitting for a few to several hours in the tree stand during a hunting session. If the platform portion is not level, then the hunter will or may have difficulty standing on the platform portion. This is very important because the hunter needs to stand in order to target and shoot an animal. Further, the hunter often has to turn or move or change his position on the tree stand in order to track, target, and shoot the animal. If the platform portion is tilted upwardly or downwardly, the hunter will at least be uncomfortable during an hours-long hunting session, and at worst will be at an increased risk of losing balance and falling off of the tree stand. There also should be little to no movement of the platform portion when the hunter is standing thereon, which movement can include a substantial increase or decrease of the angle between the tree and the tree stand so that the tree stand is no longer positioned approximately perpendicular to the tree or level. A level position increases the stability and firm seating of the tree stand on the tree trunk.

In that regard, with a hang-on tree stand, as discussed above, the hunter can stand on the climbing device while attaching the tree stand at the desired height. The hunter can therefore relatively easily and safely adjust the positioning of both the seat portion and the platform portion while the tree stand is at the desired height. This is a significant concern because the desired height at which the tree stand is placed can be rather high, in the range of approximately fifteen, twenty, or twenty-five feet off of the ground, or possibly even higher, depending on the tree. It is therefore very advantageous for the hunter to be able to perform the adjustment safely at that height. Unfortunately, the hunter using a climbing tree stand cannot do so. The hunter can do some adjustment of the seat portion while standing on the platform portion, but he cannot adjust the platform portion that he is standing on. As such, the hunter effectively cannot perform any adjustments of the platform portion of a climbing tree stand while at the desired height.

Since the hunter cannot adjust the platform portion at the desired height in the tree, the hunter instead has to guess or estimate the positioning of the climbing tree stand while still on the ground. In order to obtain a proper positioning, the hunter first looks at how much the trunk of the tree narrows or tapers the higher it goes. The hunter then estimates an angle at which he should place the platform portion. The hunter deliberately places the platform portion against the tree trunk at an upward angle in comparison to a generally vertical trunk of a tree. In other words, the platform portion is positioned at an angle with respect to the horizontal or level, such that the bracing section of the platform portion placed against the trunk of the tree is lower or closer to the ground than the free section of the platform portion. By placing the platform portion at this upward angle, once the platform portion is at the desired height, the tapering or narrowing of the tree will result in the platform portion no longer being at an upward tilted angle, but it will be level or horizontal. However, this level position is solely based on a rough estimate, the accuracy of which is dependent on the hunter's experience of using a climbing tree stand and personal knowledge of the tree. A hunter may misjudge the desired length of a strap, which strap is attached to a portion of the tree stand, which is used to secure the tree stand platform. A hunter may also misjudge a diameter, circumference, or other measurement of a tree, which may include a part of a tree which may be at least several feet above the ground. Most hunters will adjust the length of the strap of a tree stand accordingly, based upon their estimates of the measurements of a tree. These estimates may be based on their own visual observations of the tree which the user intends to climb, or may be based according to the hunter's past experience of using a tree stand with trees of similar heights or measurements. Problems may occur due to inaccurate estimations, including the problem of the hunter ascending to his desired height and then discovering that the tree stand leans too far in a direction, or is positioned at a significantly steep angle, away from the tree. Therefore, if a hunter is very experienced and/or is very familiar with the tree he wishes to climb, then the hunter may have a reasonably good chance that his estimate on the ground will result in proper, level positioning of the tree stand at the desired height. On the other hand, an inexperienced user of a climbing tree stand, or even an experienced user confronted with a tree he has never climbed, will usually have difficulty successfully estimating the angle needed to produce a level position at the desired height. In fact, a slight deviation from level can cause discomfort during a hunting session, so even experienced users on familiar trees can have difficulty obtaining the proper positioning. In addition, climbing tree stands come in various designs and sizes, and also will suffer wear over time or loosening of the straps. These factors also can make it difficult for any user to successfully estimate the angle on the ground that will result in proper positioning.

In the event the climbing tree stand is improperly positioned, the hunter is faced with essentially three choices. First, he can decide to conduct a hunting session on the improperly-positioned platform portion, which is undesirable for the reasons mentioned above. Second, he can try to adjust the platform portion while hanging from the seat portion, which is extremely dangerous and difficult to do. Third, he can climb back down the tree, readjust the angle on the ground, and then climb back up, which is the preferred method. Unfortunately, descending down the tree, making adjustments to the tree stand platform, and then ascending for a second time causes an undesirable volume or amount of noise. The process of descending and then ascending again also causes the user to make additional manual labor or movement. This manual labor or movement can cause the user to perspire, and animals with a strong sense of smell, such as deer, can smell the presence of the user nearby. In addition, even a second attempt may not produce the desired result, so more unwanted trips up and down the tree may be required. Typically, tree stand users attempt to remain hidden, as much as possible, from the animals they may hunt so as to minimize the chances of alerting any animals and causing the animals to flee. Thus, additional noises and smells could easily drive away game animals from the hunter's location, thereby defeating the purpose of using a tree stand and causing an unproductive hunting session. Therefore, no matter which of the preceding options the hunter chooses, each one presents substantial disadvantages that can lead to a poor hunting experience and possibly significant injury.

OBJECT OR OBJECTS

An object of this application is to provide a device that a hunter using a climbing tree stand can use to safely and easily make adjustments to the position or orientation of a platform portion of a climbing tree stand, while the platform portion and the hunter are at a desired height above ground on a tree trunk, to achieve a level or horizontal position of the platform portion at the desired height.

SUMMARY

The present application solves this object by a hunting tree stand adjustment device designed for use with a climbing tree stand, which allows a user, usually a hunter, to make adjustments to the position of a tree stand by inserting the wedge or step-like shaped adjustment device between a strap of a tree stand platform and the outer surface of a tree.

Using a hunting tree stand adjustment device allows the user to make minor adjustments to the position of a tree stand while the tree stand is still secured around the trunk of a tree without having to descend, make adjustments, and then ascend the tree again.

The hunting tree stand adjustment device described in the present application solves the problem of a climbing tree stand user misjudging how much compensation to give a climbing tree stand platform and misjudging the tree circumference, as the circumference of the tree usually decreases as the height of the tree increases above the ground. If a user reaches a desired height and does not judge the circumference of the tree with sufficient accuracy, the climbing tree stand platform may lean forward, or is positioned at a significantly downward angle, away from the tree.

The hunting tree stand adjustment device, according to at least one possible exemplification, has a contact surface which is positioned directly against and generally parallel to the trunk of a tree when in use. The contact surface is generally a smooth surface with a shallow, concave curve. On the side of the hunting tree stand adjustment device opposite of the contact surface is an adjustment portion. The adjustment portion comprises three adjustment levels, which adjustment levels may, in at least one possible exemplification, comprise a notch or groove indentation. In at least one possible embodiment, the number of adjustment levels could be more or less than three, such as two, four, five, six, or more. The notch or groove indentation of each adjustment level is designed so that the strap of a climbing tree stand can be positioned over the notch or groove indentation during use. A cord, which may be comprised of a rope or a nylon cord or similar cord-like or rope-like material, is attached to a flat surface at an end of the hunting tree stand adjustment device. The cord is sufficient in length for the user to attach around their wrist during use so that the user may retrieve move and position the hunting tree stand adjustment device at a desired area. The cord may also be used for the user to retrieve the hunting tree stand adjustment device in the event that the user unintentionally drops the hunting tree stand adjustment device. The cord should prevent the user from having to descend to the ground, retrieve the hunting tree stand adjustment device, and ascend the tree to a desired height again.

During use, the sloped portion of the hunting tree stand adjustment device is positioned between the strap of a climbing tree stand platform and the trunk of a tree. The user moves the hunting tree stand adjustment device in a generally vertical direction, generally parallel to the trunk of a tree, with the contact surface of the hunting tree stand adjustment device making contact with the trunk of a tree and with the adjustment portion of the hunting tree stand adjustment device facing away from the trunk of a tree, until the hunting tree stand adjustment device is positioned in accordance with the user's desired level of adjustment. The user may select the first adjustment level in order to substantially adjust the position of the climbing tree stand platform to a more desirable position. The user may select the second adjustment level in order to make an adjustment to the tree stand platform smaller than an adjustment made with the first adjustment level. The user may select the third, or micro, adjustment level in order to make an adjustment to the tree stand platform smaller than an adjustment made with either the first or the second adjustment levels. The hunting tree stand adjustment device is intended for the user to make generally minor adjustments to the tree stand platform. If the user feels that the tree stand platform is positioned at an unsafe angle from the trunk of the tree which could potentially cause the user to fall or become injured, the hunting tree stand adjustment device should not be used and instead the user should descend, adjust the tree stand platform while positioned near ground level, and ascend the tree again.

The adjustment levels of the hunting tree stand adjustment device are designed to accommodate climbing tree stands manufactured, produced, or sold by at least three major companies in the climbing tree stand industry. This allows for the hunting tree stand adjustment device to be used with most or nearly all climbing tree stands manufactured, produced, or sold by the brands Lone Wolf, API, or Summit.

The hunting tree stand adjustment device is made of a solid or hard plastic or elastomeric material, but could also be made of other suitable materials, such as rubber or wood or metal or metallic materials.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EXEMPLIFICATION OR EXEMPLIFICATIONS

Figure 1:
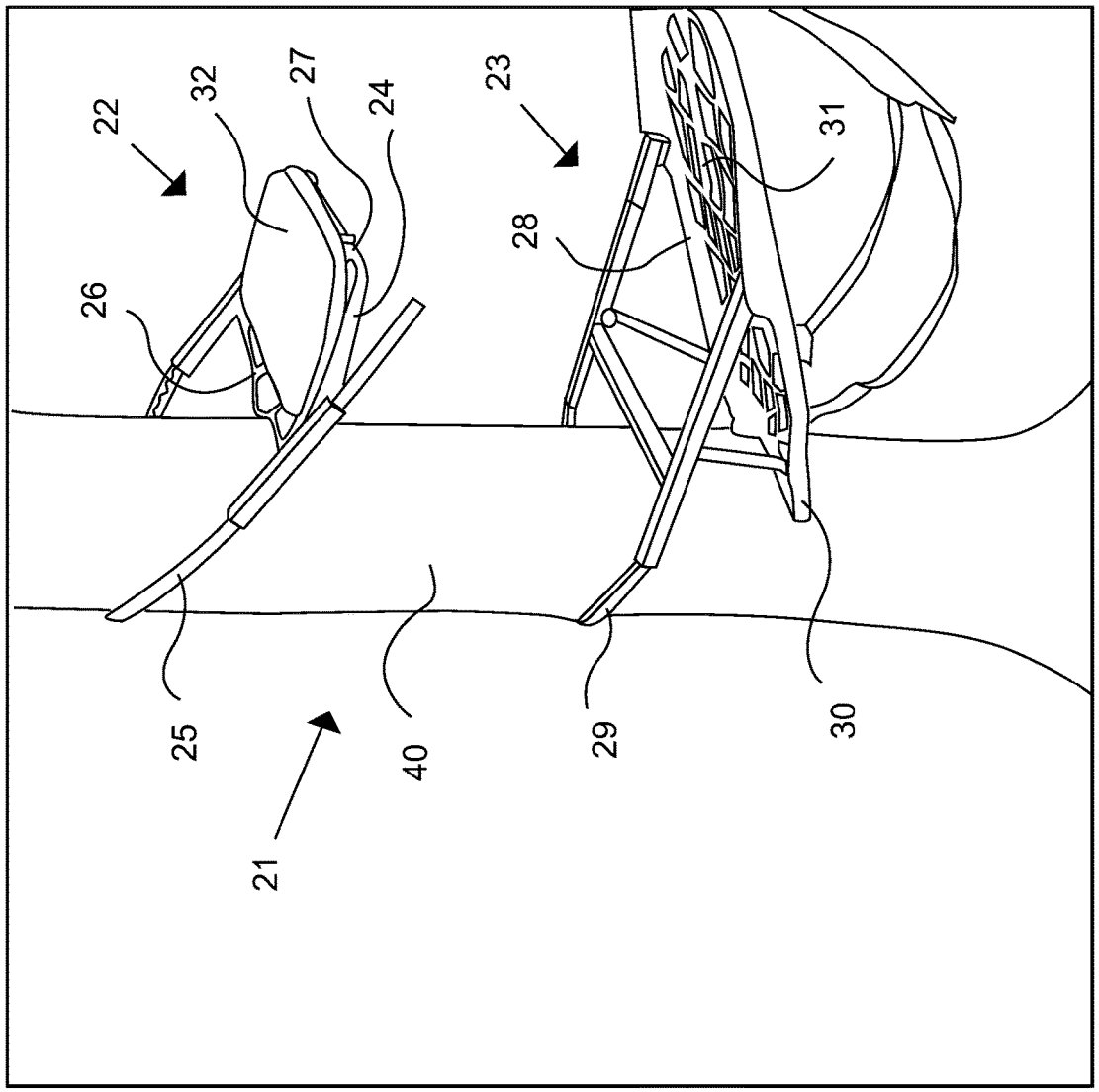
FIGS. 1, 2, and 3 show a climbing tree stand for hunting and how to install a climbing tree stand on a tree trunk.

FIG. 1 shows a climbing tree stand 21 when it is initially attached to a tree trunk 40 near to the ground. The climbing tree stand 21 is made up of two separate parts, specifically a seat portion 22 and a platform portion 23. The seat portion 22 has a seat or cushion 32 mounted on a support frame 24, on which a hunter can sit. The support frame 24 is rigid and comprises a bracing section 26, which is designed to engage or brace against the tree trunk 40, and a free section 27, which projects out and away from the tree trunk 40. The seat 32 covers most of the free section 27. The platform portion 23 also has a support frame 28, on which a hunter 20 can stand (see FIG. 2). The support frame 28 of the platform portion 23 also includes a bracing section 30 and a free section 31.

In order to connect the seat portion 22 to the tree trunk 40, a strap device 25 is looped around the tree trunk. Both ends of the strap device 25 are attached to connecting arms of the seat portion 22. The strap device 25 is adjusted in length until the seat portion 22 is generally perpendicular to the tree trunk 40 and level with the ground. Similar steps are taken to attach the platform portion 23 using a strap device 29. One difference is that the platform portion 23 is angled upwardly, such as is seen in FIG. 1, such that the platform portion 23 will be level or essentially level when at the desired height on the tree trunk 40, as discussed herein above.

Figure 2:
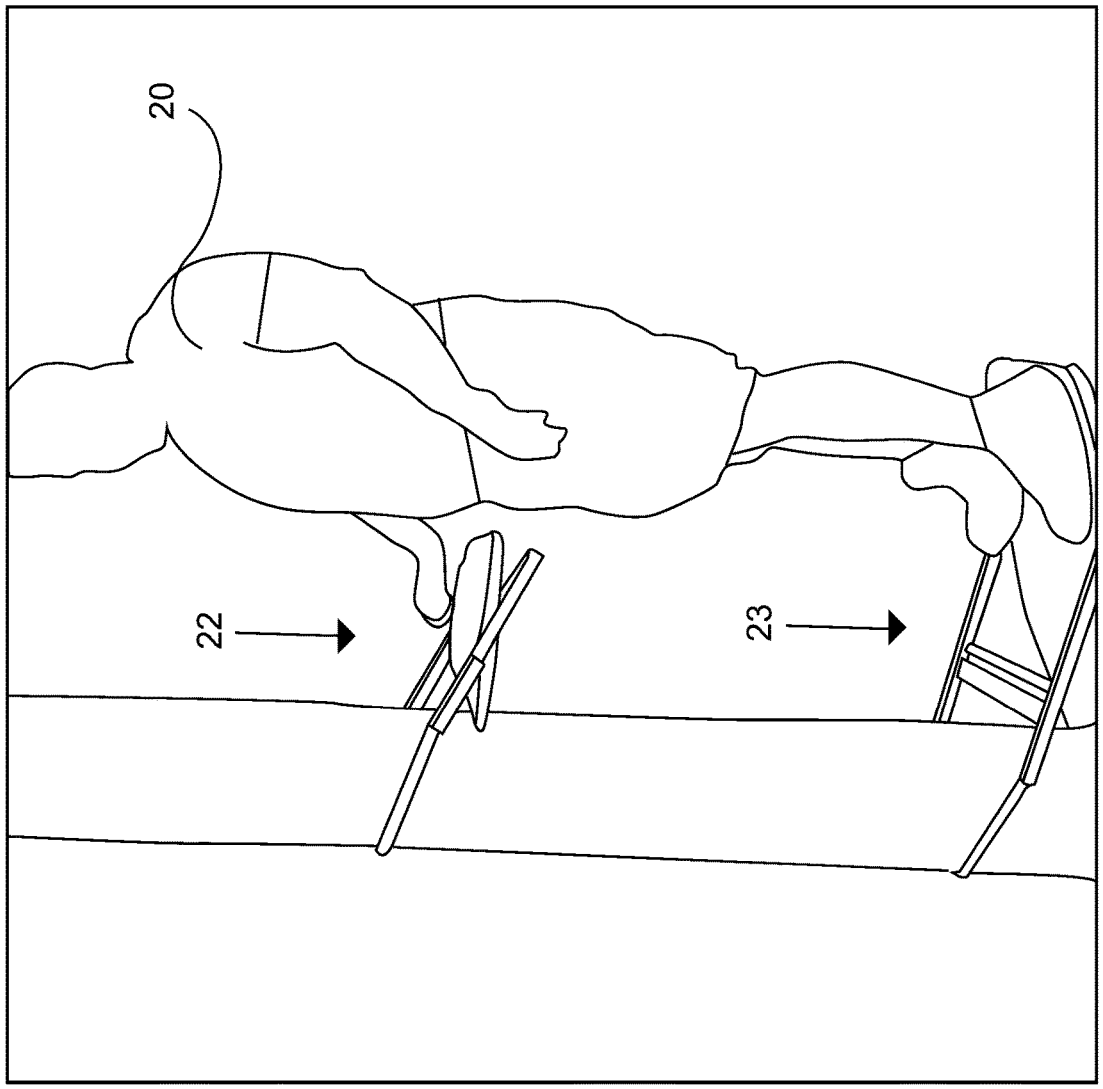
Figure 3:
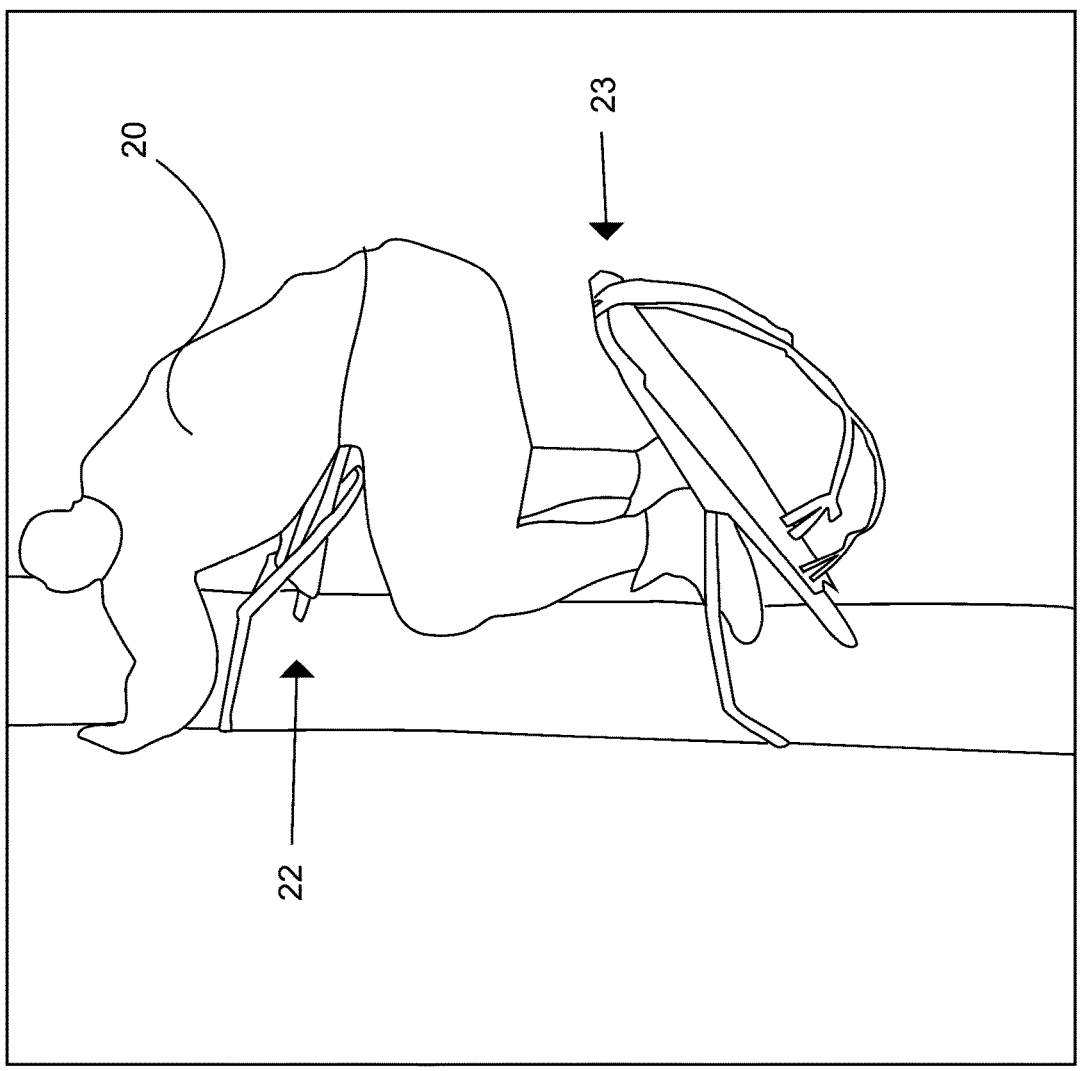
Figure 12:
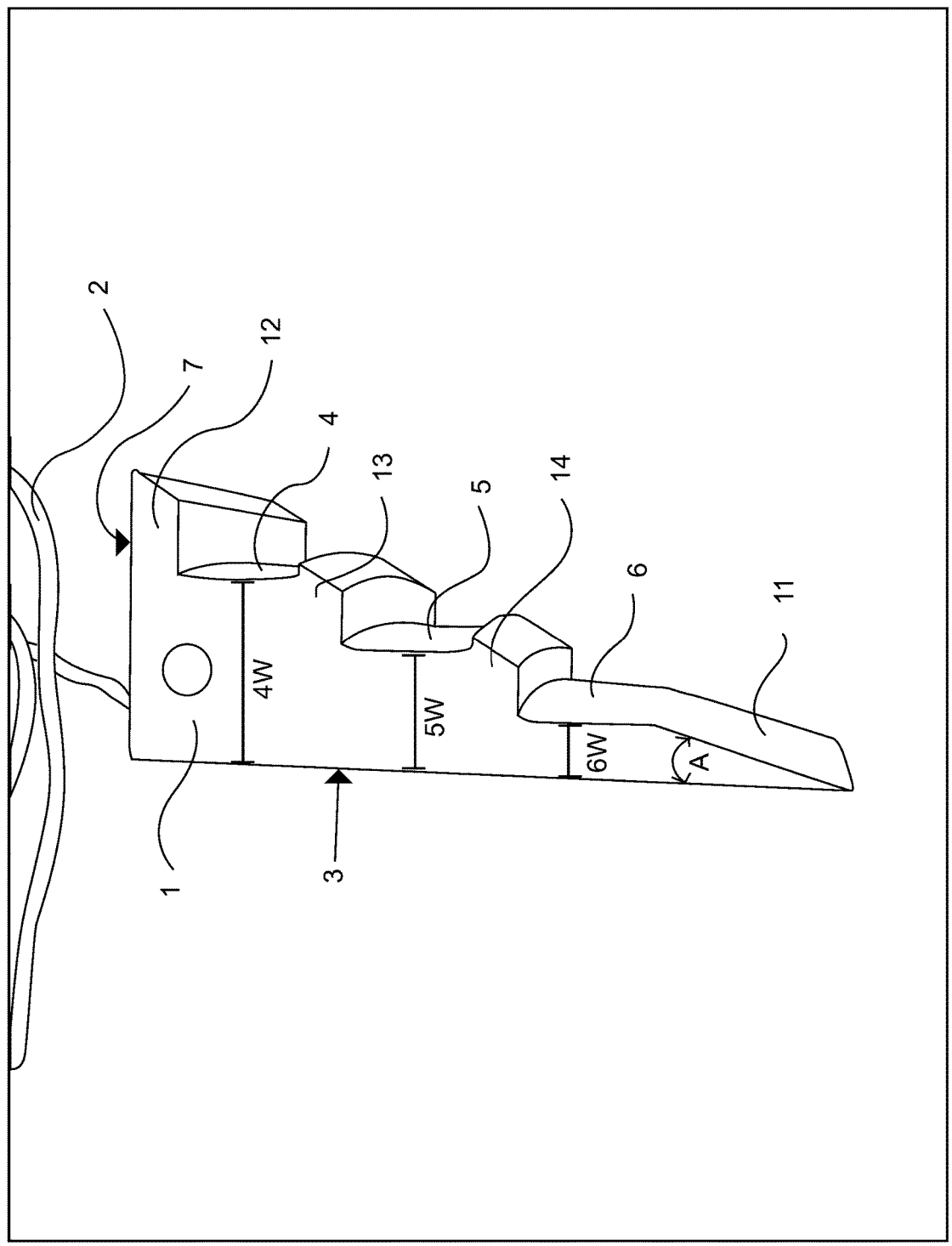
FIGS. 12 through 20 show various views of the hunting tree stand adjustment device.

FIG. 3 shows a step in the climbing process. Prior to this step, the hunter 20 stands on the platform portion 23, as shown in FIG. 2. Next, the hunter 20, holding the seat portion 22 with his hands, moves the seat portion 22 a distance of generally one to two feet away from the ground and up the tree trunk 40. The hunter 20 starts to ascend the tree trunk 40 by pulling himself up onto the seat portion 22, such that the hunter 20 is supporting his body weight on the seat portion 22, as shown in FIG. 12. The hunter 20 hooks his feet into the support frame 28 of the platform portion 23 and, as shown in FIG. 3, crouches his body and uses his feet to lift the platform portion 23 to a higher position on the tree trunk 40. The hunter 20 then secures the platform portion 23 to the tree trunk 40 such that he can stand on the platform portion 23. The hunter 20 ascends the tree trunk 40 by alternating between the crouched position and the standing position, and thus alternating movement of the seat portion 22 and platform portion 23 up the tree trunk 40.

Figure 4:
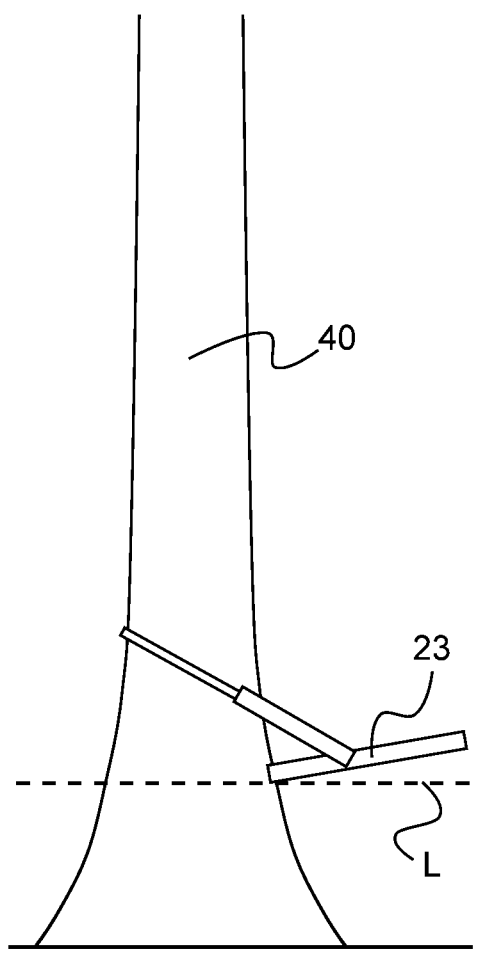
FIGS. 4, 4A, and 4B show a climbing tree stand platform and adjustment of the tree stand platform using a hunting tree stand adjustment device, according to one possible exemplification.
Figure 4A:
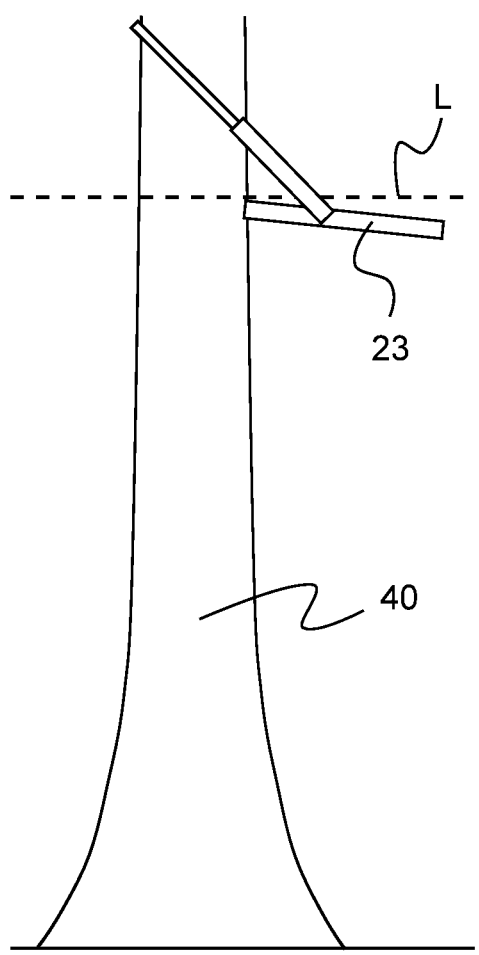
Figure 4B:
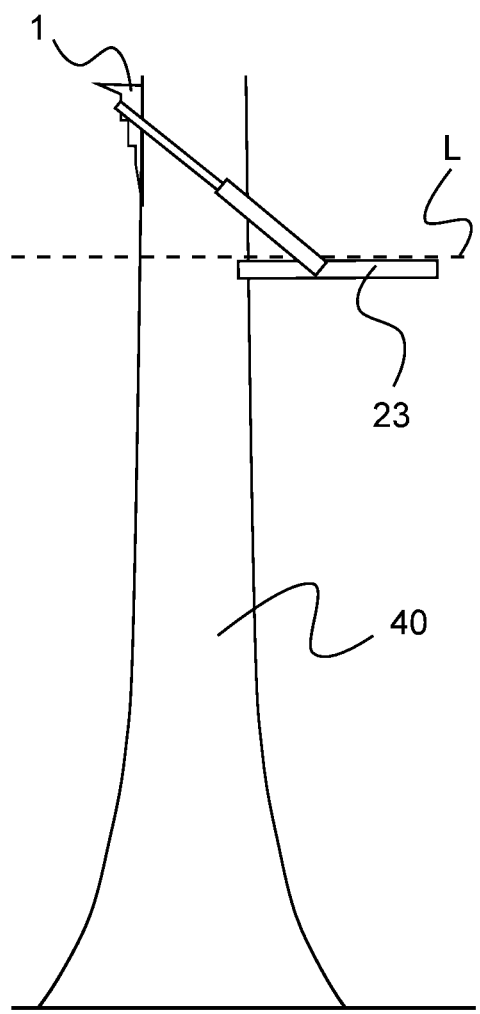

If the hunter 20 has accurately estimated the initial angle of the platform portion 23 when he first places the strap device 29 on the tree trunk 40, then the platform portion 23 should be level or essentially level with respect to the ground or horizontal when the hunter 20 has climbed to the desired height of the tree trunk 40. However, if this is not the case, then the hunter 20 can utilize a hunting tree stand adjustment device 1, as discussed herein, to level out the platform portion 23 while on the tree trunk 40. This concept is illustrated in FIGS. 4, 4A, and 4B, which show the platform portion 23 at various positions on a tree trunk 40. FIG. 4 shows the platform portion 23 when it is first attached to the tree trunk 40 when the hunter is standing on the ground. As can be seen in FIG. 4, the platform portion 23 is angled upwardly at an angle with respect to the horizontal or level, represented by the dotted line L. FIG. 4A shows the platform portion 23 at a desired height on the tree trunk 40. At this point, the hunter has climbed the tree and advanced the platform portion 23 to a desired height. Unfortunately, in FIG. 4A, the hunter has miscalculated the initial placement angle shown in FIG. 4. As a result, the platform portion is not level, and is instead tilted downwardly, such that the hunter is standing on an angled or sloped surface, which can be dangerous. In this situation, the hunter can use the hunting tree stand adjustment device 1 to adjust the orientation of the platform portion 23 to compensate for the miscalculation and bring the platform portion 23 to a level position that is parallel or essentially parallel to the horizontal or level line L. This adjustment is accomplished as shown in FIG. 4B, wherein the hunting tree stand adjustment device 1 has been placed between the strap device and the tree trunk 40.

Figure 5:
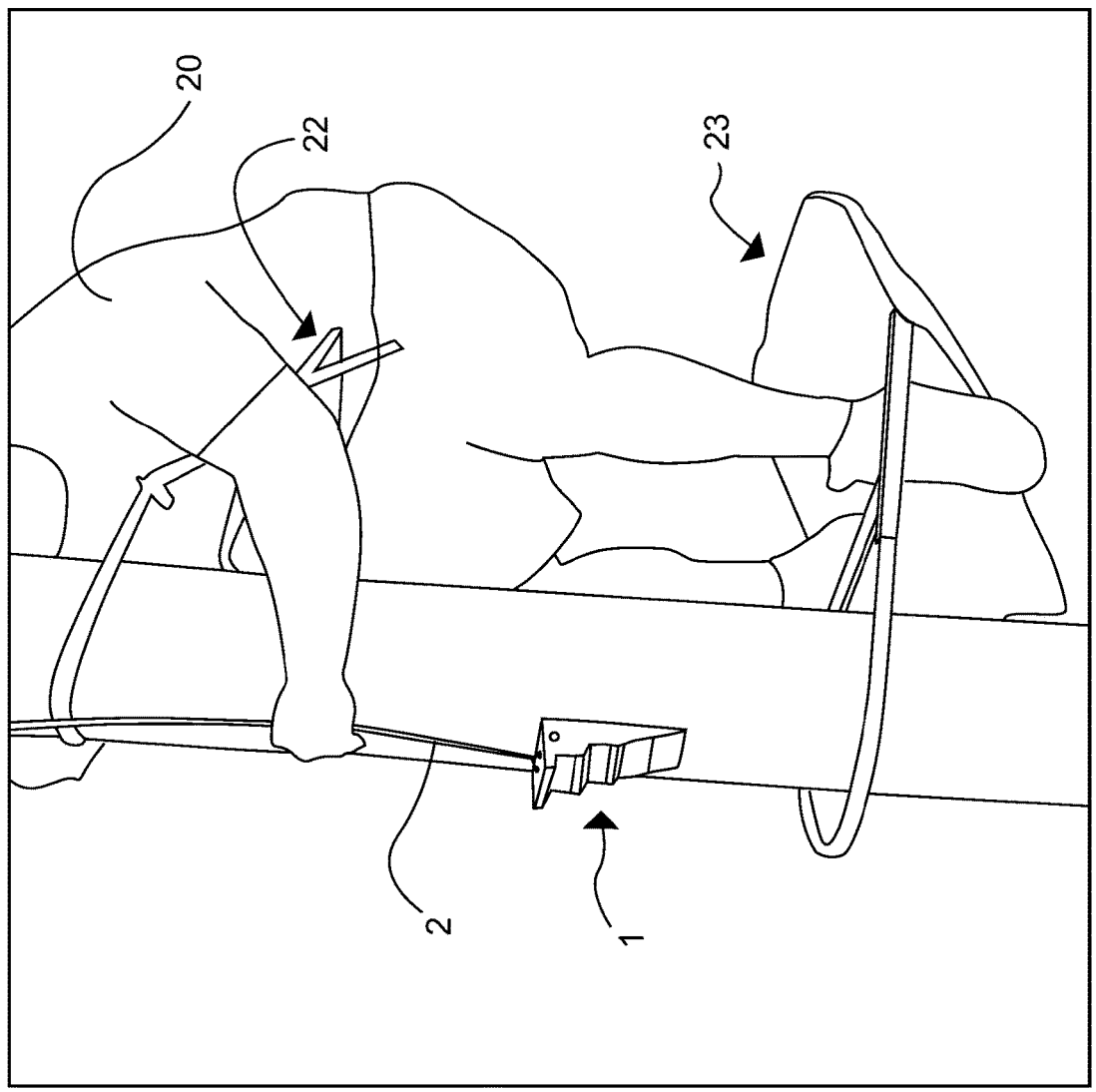
FIGS. 5 and 6 show how to install the hunting tree stand adjustment device.
Figure 6:
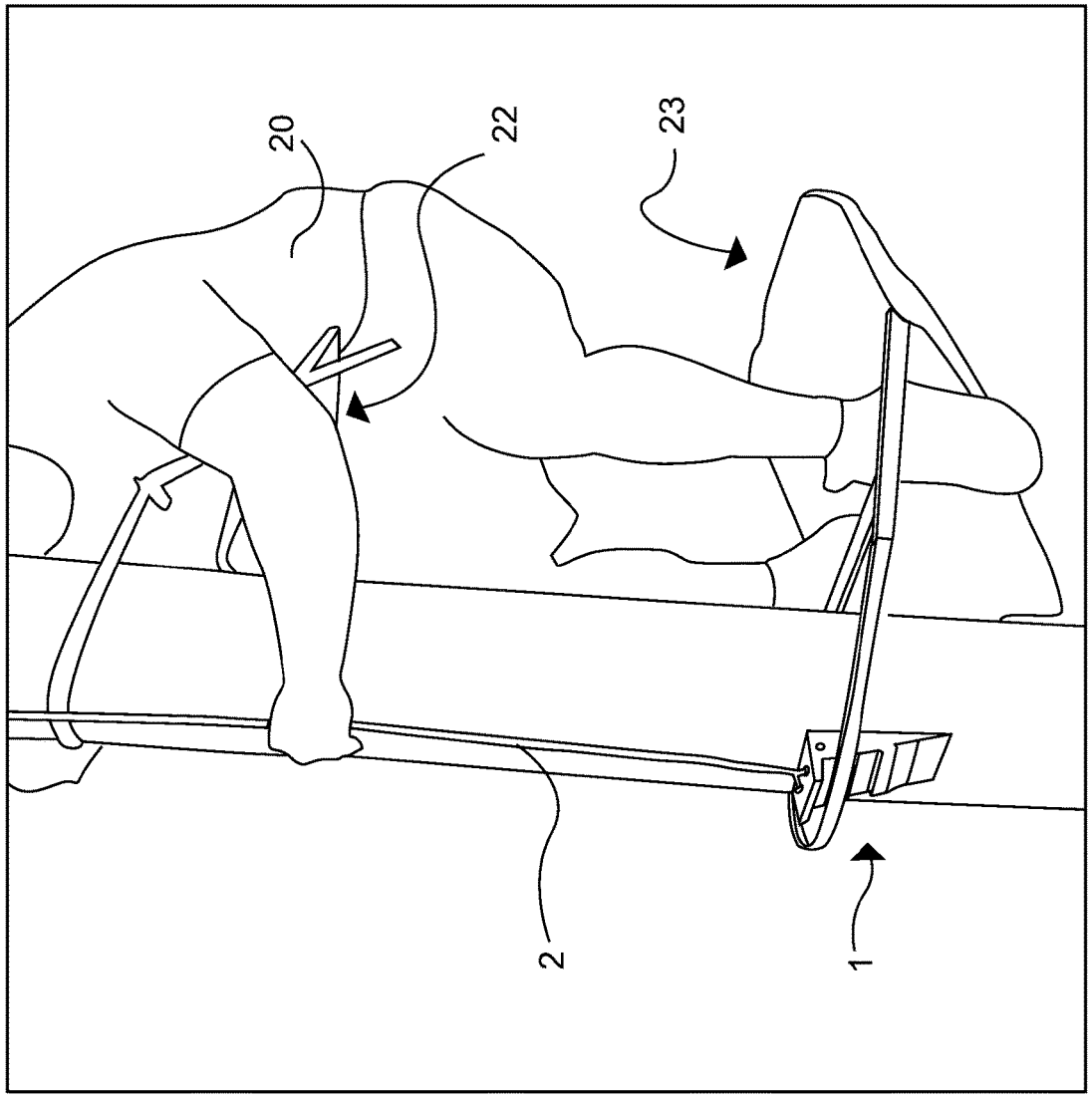
Figure 7:
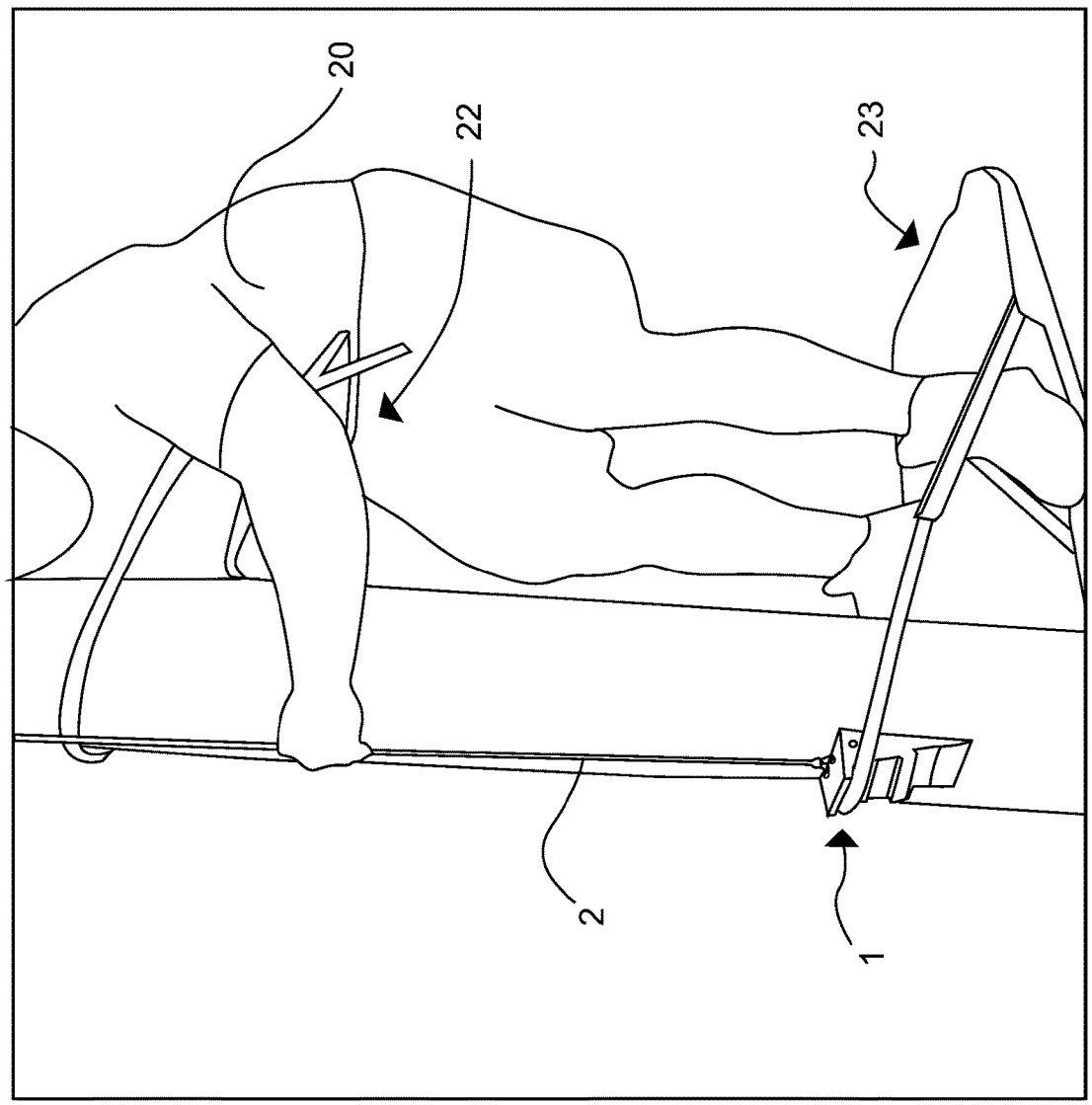
FIGS. 7, 8, 9, and 10 show views of the hunting tree stand adjustment device installed.
Figure 8:
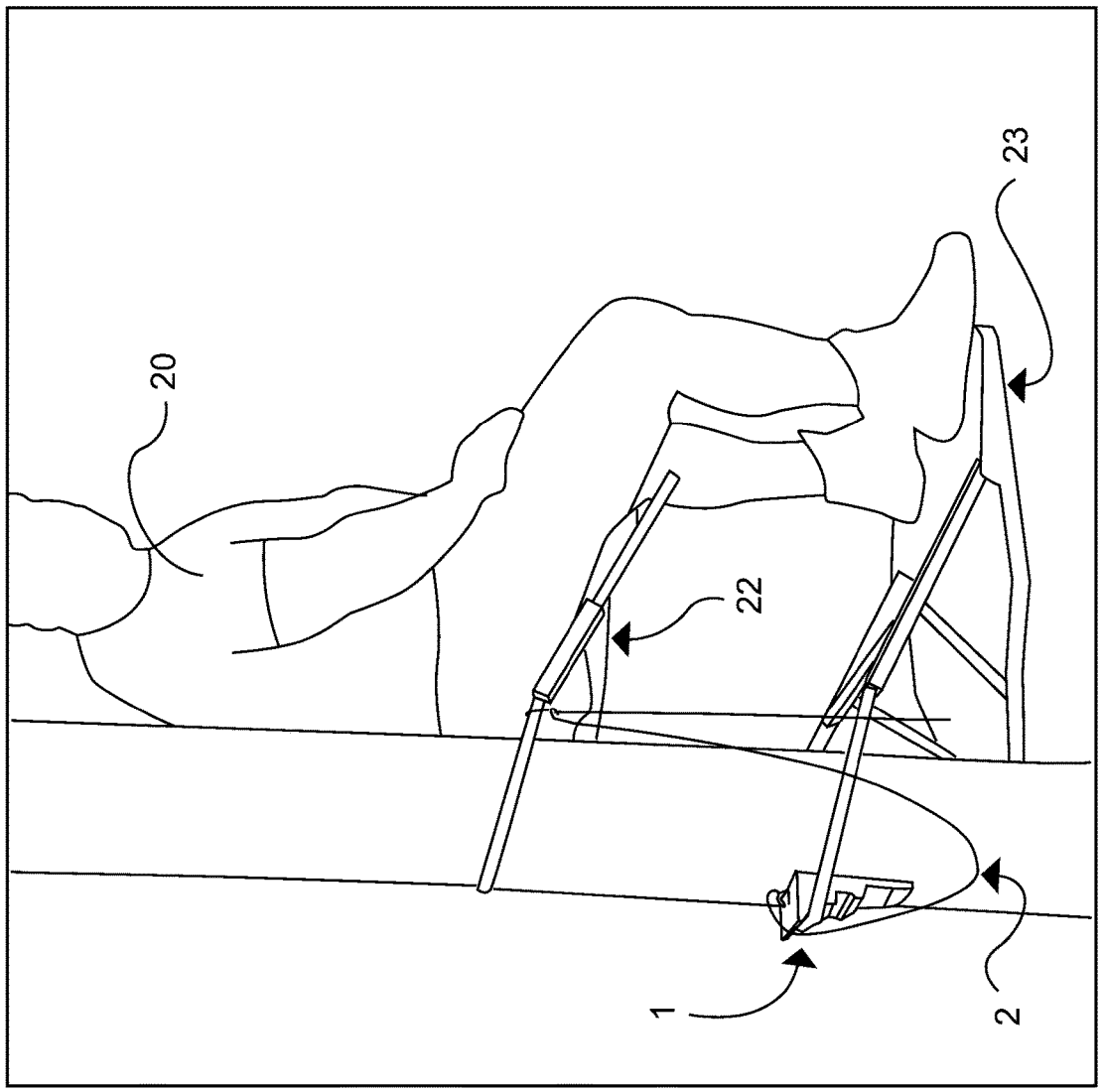
Figure 9:
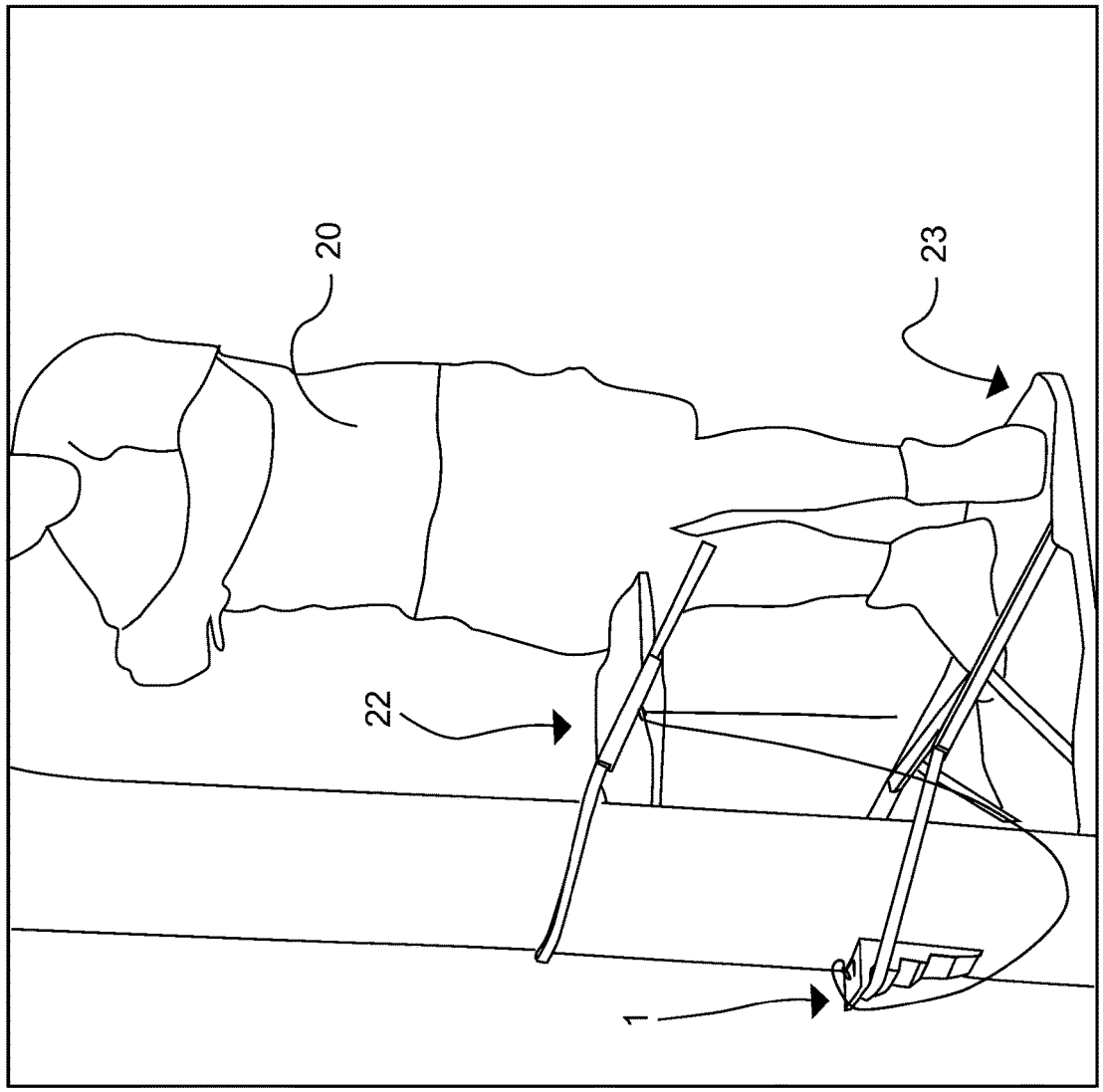
Figure 10:
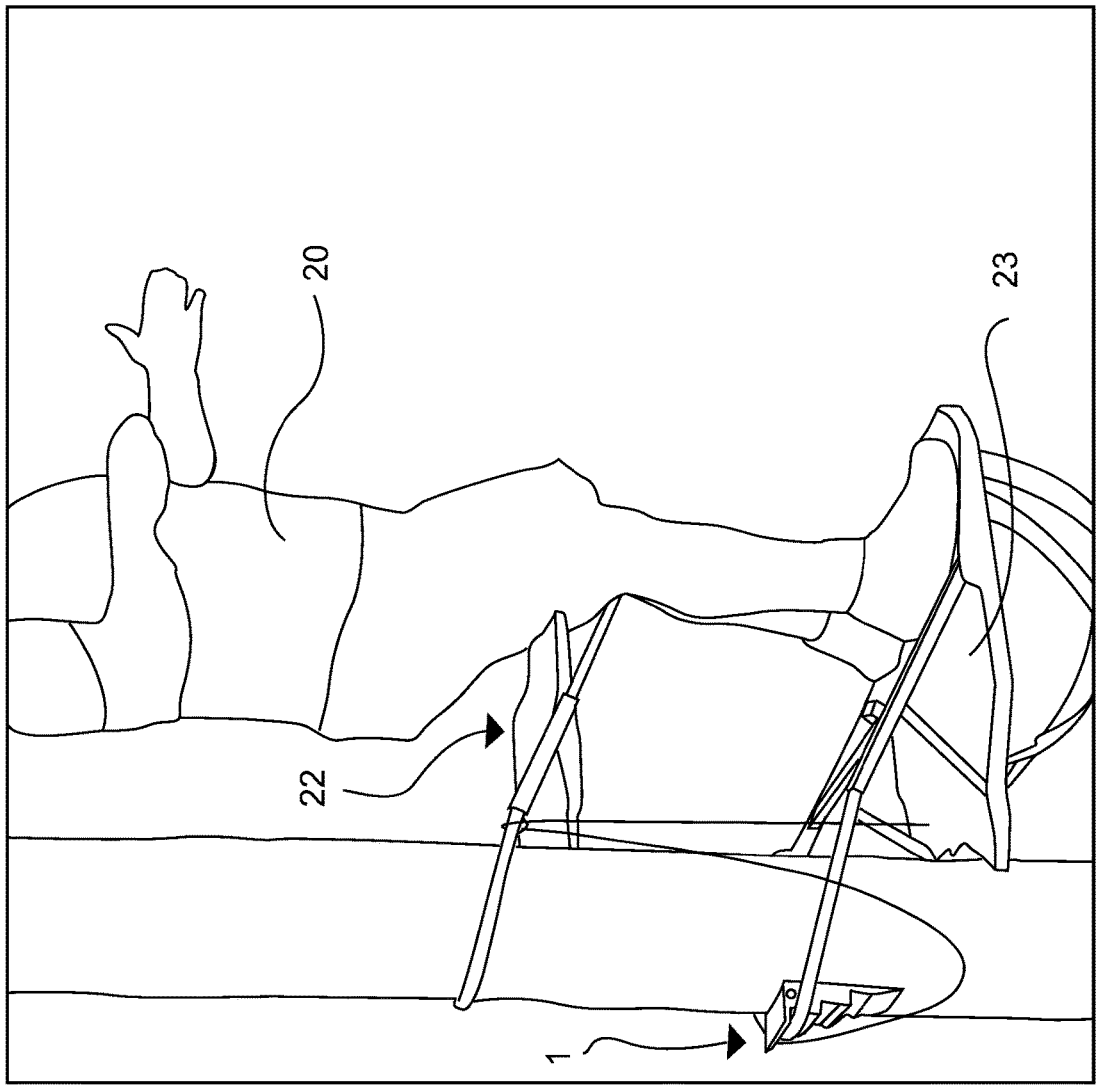

To further explain, as shown in FIG. 5, the hunter 20 is at the desired height on the tree trunk 40, but the platform portion 23 is not at a desired orientation, that is, level or essentially level with the ground. The hunter 20 therefore goes into the crouched position, such as shown in FIG. 3, in order to lift up the platform portion 23 with his feet. The hunter 20 creates sufficient space between the strap device 29 and the outside of the tree trunk 40 in order for the hunter 20 to lower or slide or place the hunting tree stand adjustment device 1 in a desired position. A cord 2 of the hunting tree stand adjustment device 1 should be secured around the hunter's wrist to prevent the hunting tree stand adjustment device 1 from falling to the ground if dropped. To lower the hunting tree stand adjustment device 1 into the hunter's desired position, the hunter 20 uses the cord 2 to raise, lower, or otherwise move the hunting tree stand adjustment device 1. One end of the cord 2 is attached to the cord surface 7 of the hunting tree stand adjustment device 1. The second end of the cord 2 is secured to the hunter 20 by either a loop 9, knot, or other suitable attachment. The cord 2 allows the hunter 20 to increase his safety during installation by allowing him to essentially grasp the tree trunk 40 for added support and stability. The hunting tree stand adjustment device 1 is positioned so that the contact surface 3 is the side closest to the tree trunk 40, and so that the adjustment portions are positioned so that they face away from the tree trunk 40. The hunting tree stand adjustment device 1 is lowered so that a sloped end first passes between the strap device 29 and the outside of the tree trunk. Depending on the amount of adjustment needed, the hunter 20 will lower the hunting tree stand adjustment device 1 until the strap device 29 is placed at a desired one of a tree adjustment portion 4, 5, and 6. As shown in FIG. 6, the hunter 20 has lowered the hunting tree stand adjustment device 1 such that the strap device 29 is aligned with a first adjustment portion 4. The hunter 20 will then use his feet to pivot or tilt the platform portion 23 to bring the strap device 29 into contact with the first adjustment portion 4 of the hunting tree stand adjustment device 1. The strap device 29 presses and holds the hunting tree stand adjustment device 1 against the tree trunk 40, as shown in FIG. 7. If the correct adjustment has been performed, the platform portion 23 should be positioned so that it is generally perpendicular to the tree trunk 40 and generally parallel or level to the ground. The hunter 20 should be able to stand or sit or position himself on the platform portion 23 without feeling unbalanced, uncomfortable, or unsafe, as is shown in FIGS. 8, 9, and 10. However, if the platform portion 23 is not in the desired position or orientation after adjustment, then the hunter 20 can easily re-position or re-orient the platform portion 23 by using a different one of the adjustment portions 4, 5, and 6. This provides the hunter 20 with the great advantage of being able to position or orient the platform portion 23 as desired while at a substantial height up the tree trunk 40 without having to climb back down the tree.

Figure 11:
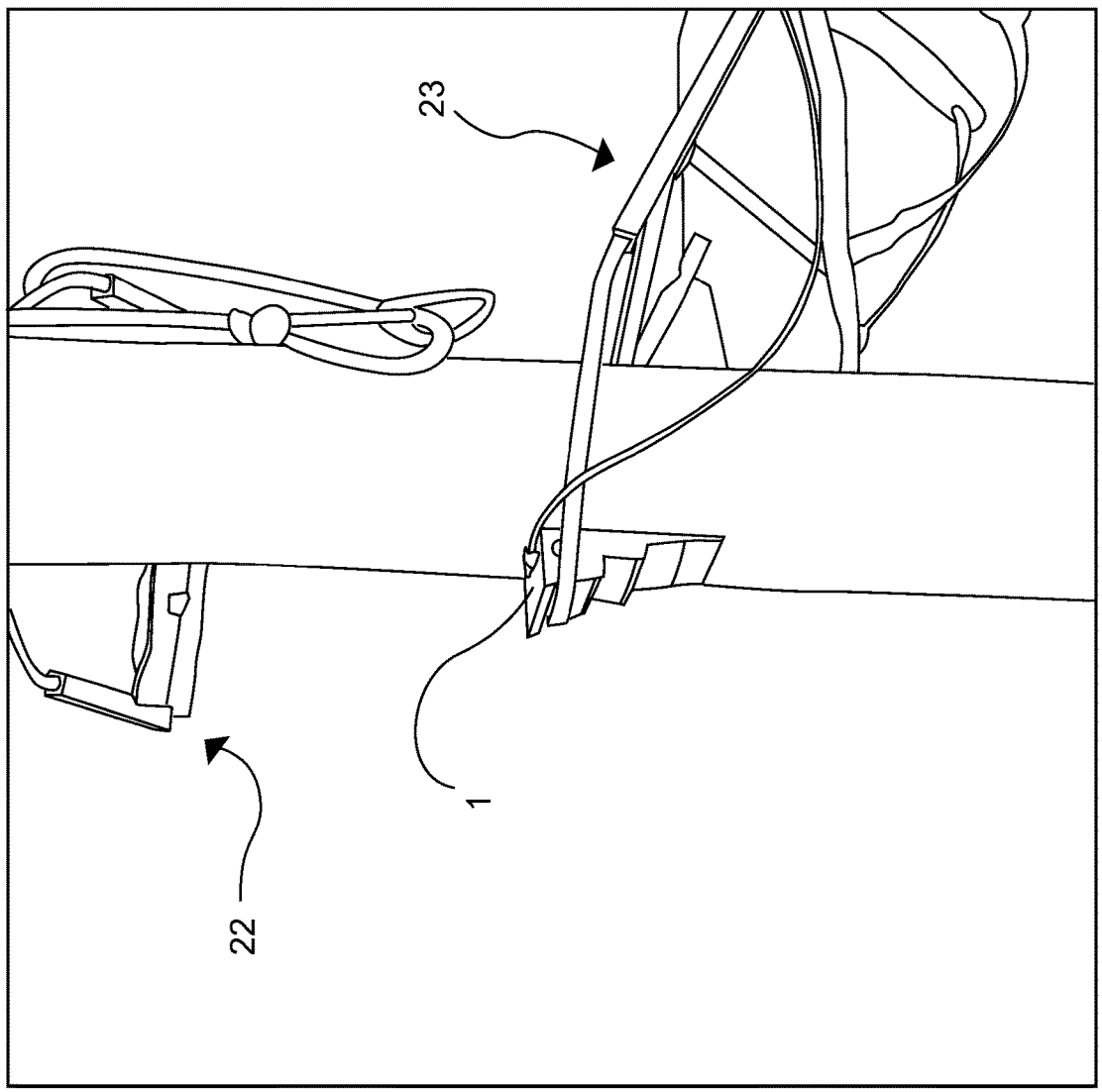
FIG. 11 shows the hunting tree stand adjustment device installed.
Figure 11A:
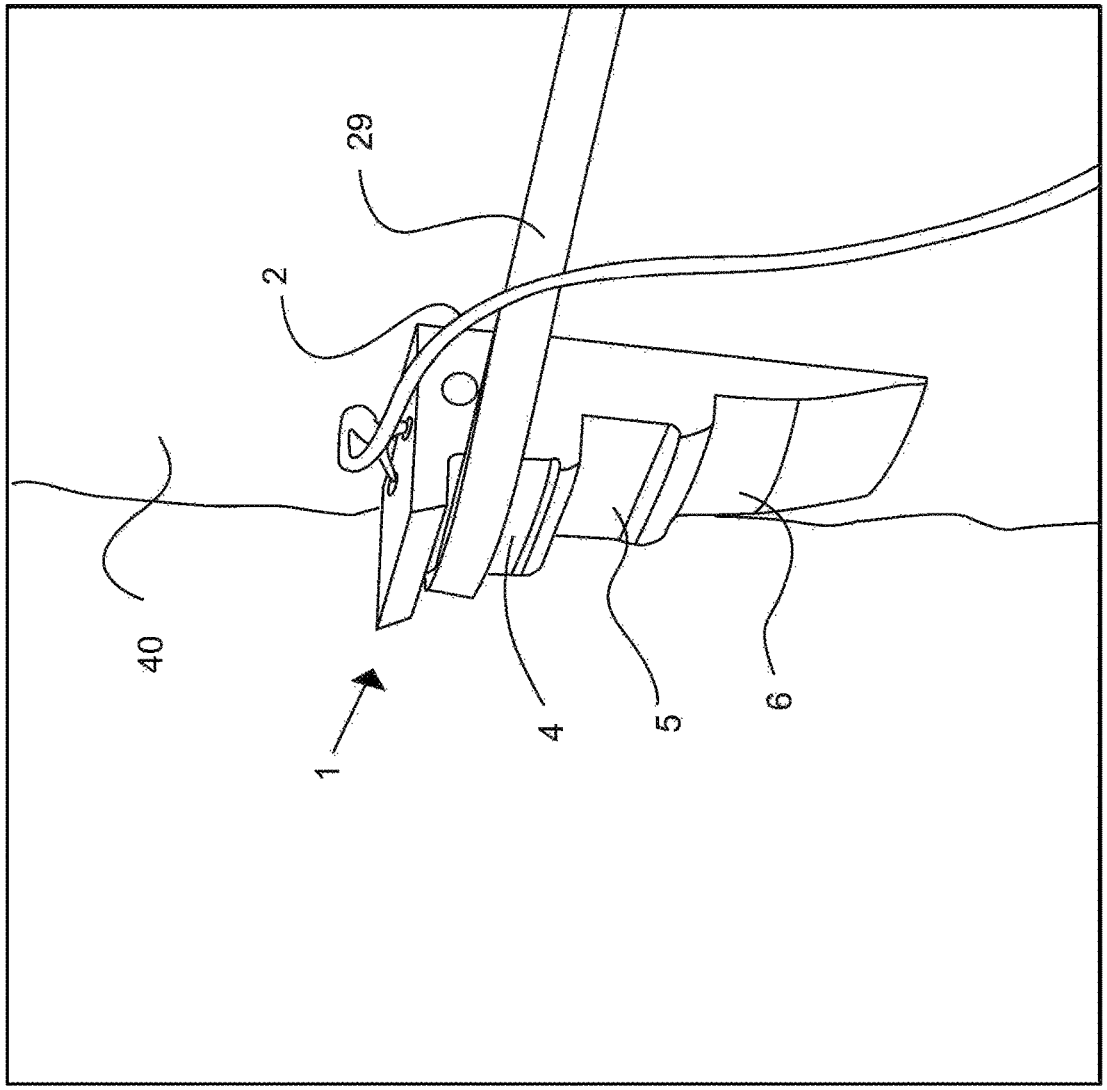
FIG. 11A shows a close-up view of the hunting tree stand adjustment device installed.

FIG. 11 shows the hunting tree stand adjustment device 1 in use with the strap device 29 of the platform portion 23, with the strap device 29 positioned, for example, at the adjustment portion 4. FIG. 11A shows a close-up view of the hunting tree stand adjustment device 1.

FIG. 12 shows the hunting tree stand adjustment device 1 according to at least one possible exemplification. The hunting tree stand adjustment device 1 is comprised of a contact surface 3, a cord 2, and approximately three adjustment portions 4, 5, and 6. The cord 2 is fastened on one end of the hunting tree stand adjustment device 1 at an end surface 7 oriented transverse to the contact surface 3. The contact surface 3 is, in at least one possible exemplification, a generally smooth surface with a shallow, concave curve 10 (see FIG. 13). The contact surface 3 is designed to come in contact with the outer surface of a trunk of a tree during use, and is curved to generally follow or match the curved outer surface of a tree trunk. Positioned opposite of the contact surface 3 are the adjustment portions 4, 5, and 6. When in use, the adjustment portions 4, 5, and 6 are positioned so that they are facing away from the trunk of a tree while the contact surface 3 makes contact with the trunk of a tree. Each adjustment portion 4, 5, and 6, in at least one possible exemplification, may be comprised of either a notch or groove indentation. The surface of each adjustment portion 4, 5, and 6 is a smooth and generally curved or generally flat surface, against which a portion of a strap device 29 of a platform portion 23 of a climbing tree stand 21 (see FIG. 1) is positioned when the hunting tree stand adjustment device 1 is installed. The first adjustment portion 4 is the widest or thickest adjustment level having a width or thickness or adjustment level 4W, as measured from the contact surface 3 to the surface of the adjustment portion 4. The first adjustment level 4W allows the user to substantially adjust the position and/or orientation of the platform portion 23 of the climbing tree stand 21 to a desired or more desirable position. The second adjustment portion 5 is positioned between the first adjustment portion 4 and third adjustment portion 6. The second adjustment portion 5 has a width or thickness or adjustment level 5W, which allows the user to adjust the platform portion 23 in a smaller increment than an adjustment made using the first adjustment portion 4. The third adjustment portion 6, or micro adjustment portion, has a width or thickness or adjustment level 6W that allows the user to make an adjustment to the platform portion 23 that is smaller than an adjustment made with either the first adjustment portion 4 or the second adjustment portion 5. While three thicknesses or levels 4W, 5W, and 6W are shown, other possible designs could include more or fewer adjustment levels of varying thicknesses for a greater variety of adjustments. In the embodiment shown, the third adjustment portion 6 transitions at transition portion 15 (see FIG. 14) into a sloped surface 11 that is at an acute angle A with respect to the contact surface 3. The hunting tree stand adjustment device 1 tapers down to an edge at the end of the sloped surface 11, which promotes easy and simple insertion of the hunting tree stand adjustment device 1 between the strap device 29 and a tree trunk, as shown in FIGS. 5 and 6. The hunting tree stand adjustment device 1 also includes three projections or projecting portions 12, 13, and 14. The first projection 12 assists in positioning the hunting tree stand adjustment device 1 with respect to the strap device 29, as well as to help prevent the hunting tree stand adjustment device 1 and the strap device 29 from inadvertently sliding out of engagement with one another, such as the strap device 29 sliding off of the first adjustment portion 4. The second projection 13 and the third projection 14 similarly assist in positioning of the strap device 29 and minimizing or preventing inadvertent movement of the hunting tree stand adjustment device 1 and the strap device 29 out of a desired position. In at least one possible embodiment, the projections 13 and 14 could be flattened out or smoothed to match the surfaces of the corresponding adjustment portions 4 and 5, such that the hunting tree stand adjustment device 1 has a step-like or stair-like shape or profile.

Figure 13:
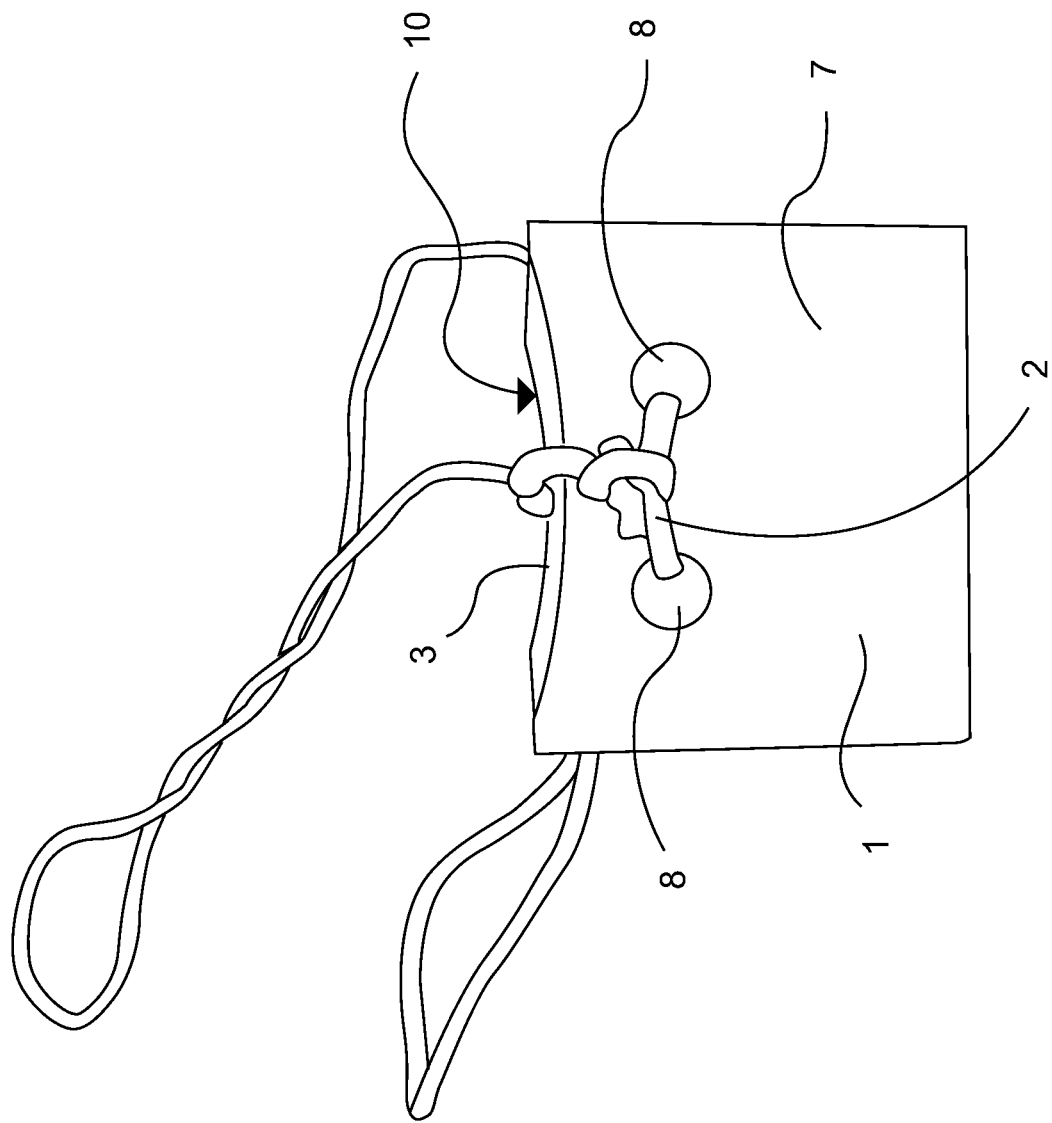
Figure 14:
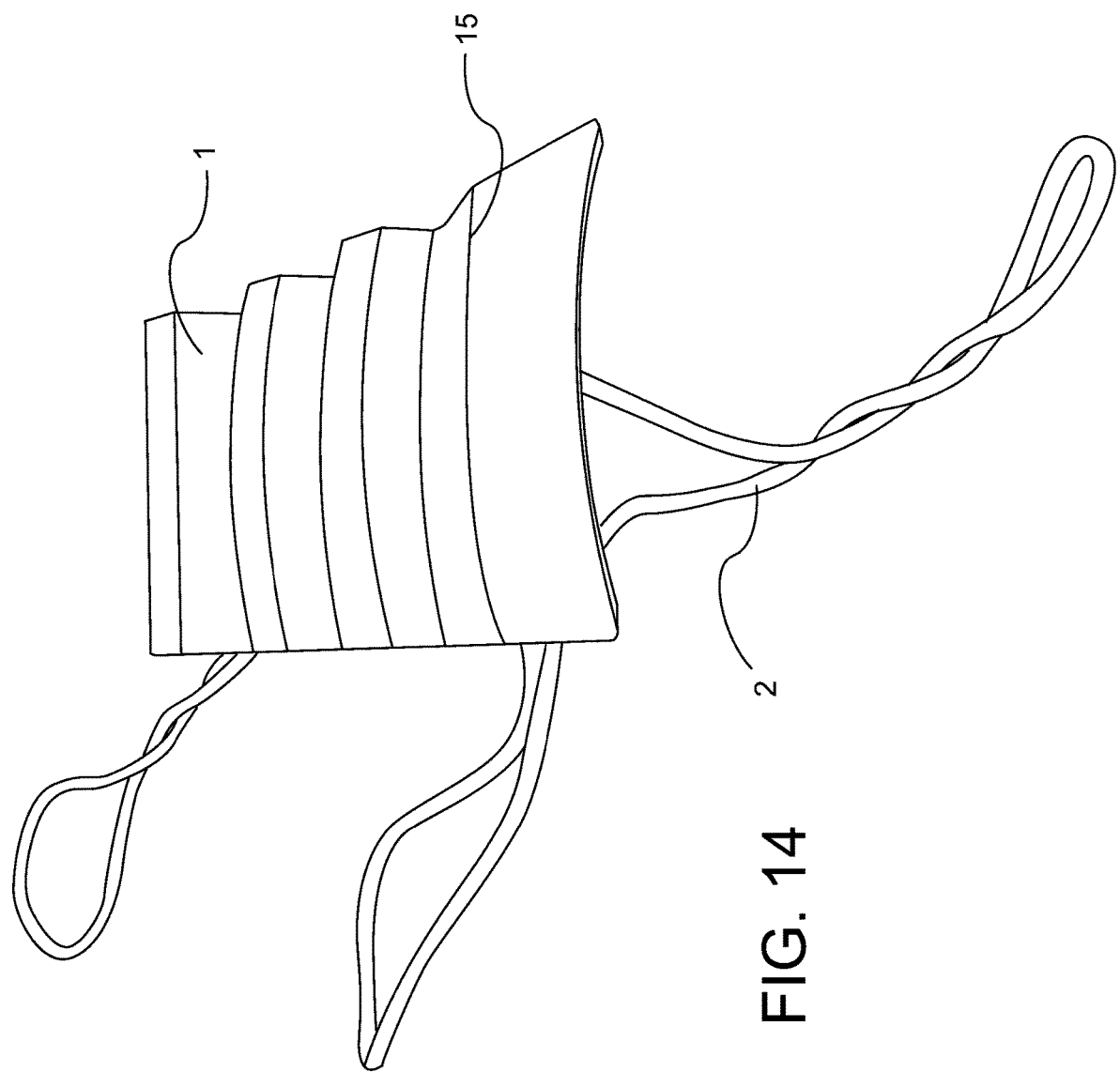
Figure 15:
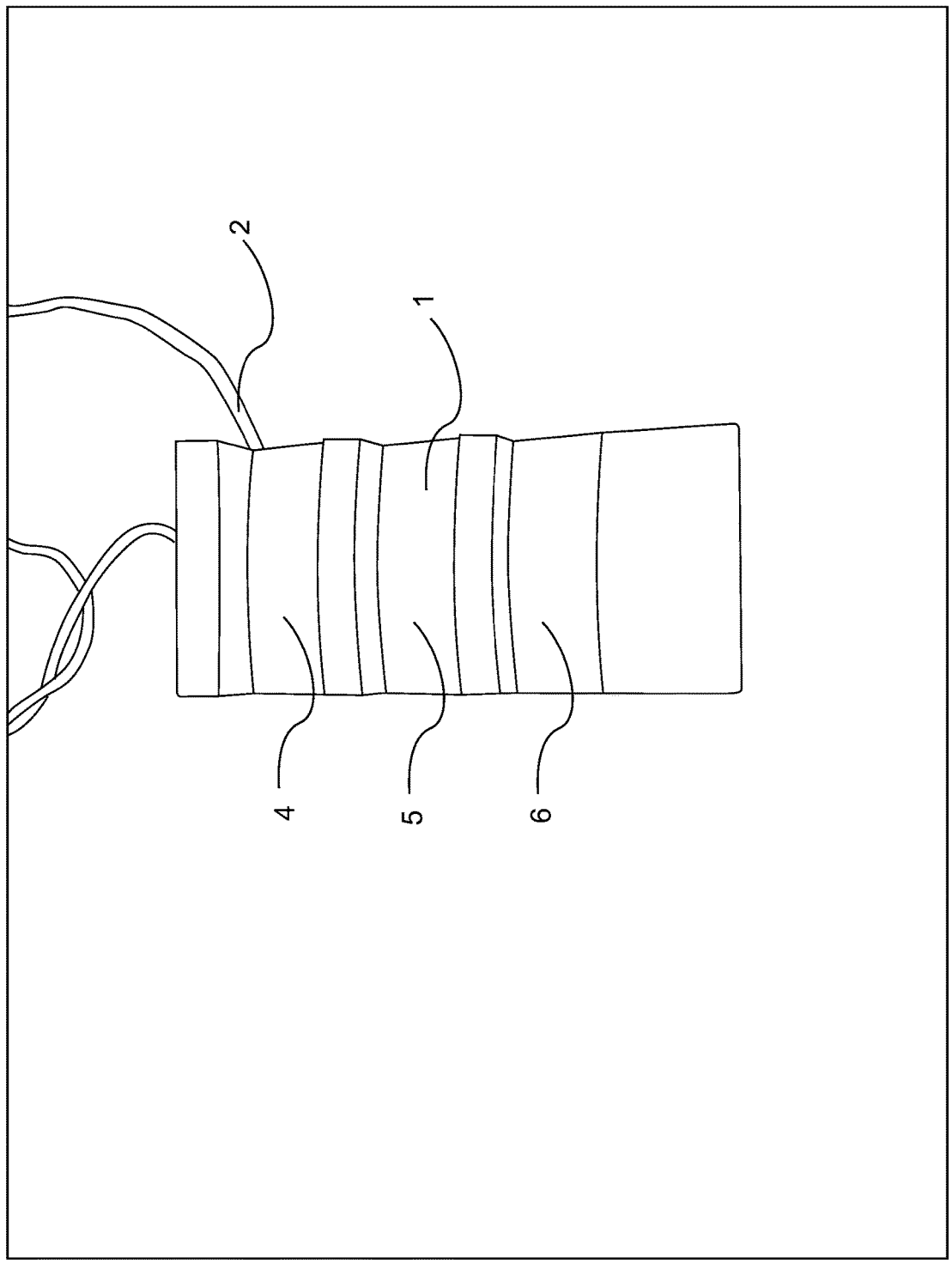

FIG. 13 shows the cord 2 and the cord surface or end surface 7 of the hunting tree stand adjustment device 1. The cord 2 may be, in one possible exemplification, a cord or string made from nylon, cotton, plastic, or other synthetic or natural materials. The cord surface 7 is a generally flat surface which is positioned at an end of the hunting tree stand adjustment device 1 and adjacent to the contact surface 3 and the adjustment portion 4. The cord 2 may, in one possible exemplification, be secured to the hunting tree stand adjustment device 1 by passing the cord 2 material through a space inside the hunting tree stand adjustment device 1 via two holes or openings 8 positioned in the cord surface 7. The cord 2 is then tied to itself so that a loop is created in the part of the cord 2 which passes through the holes 8 in the cord surface 7.

Figure 16:
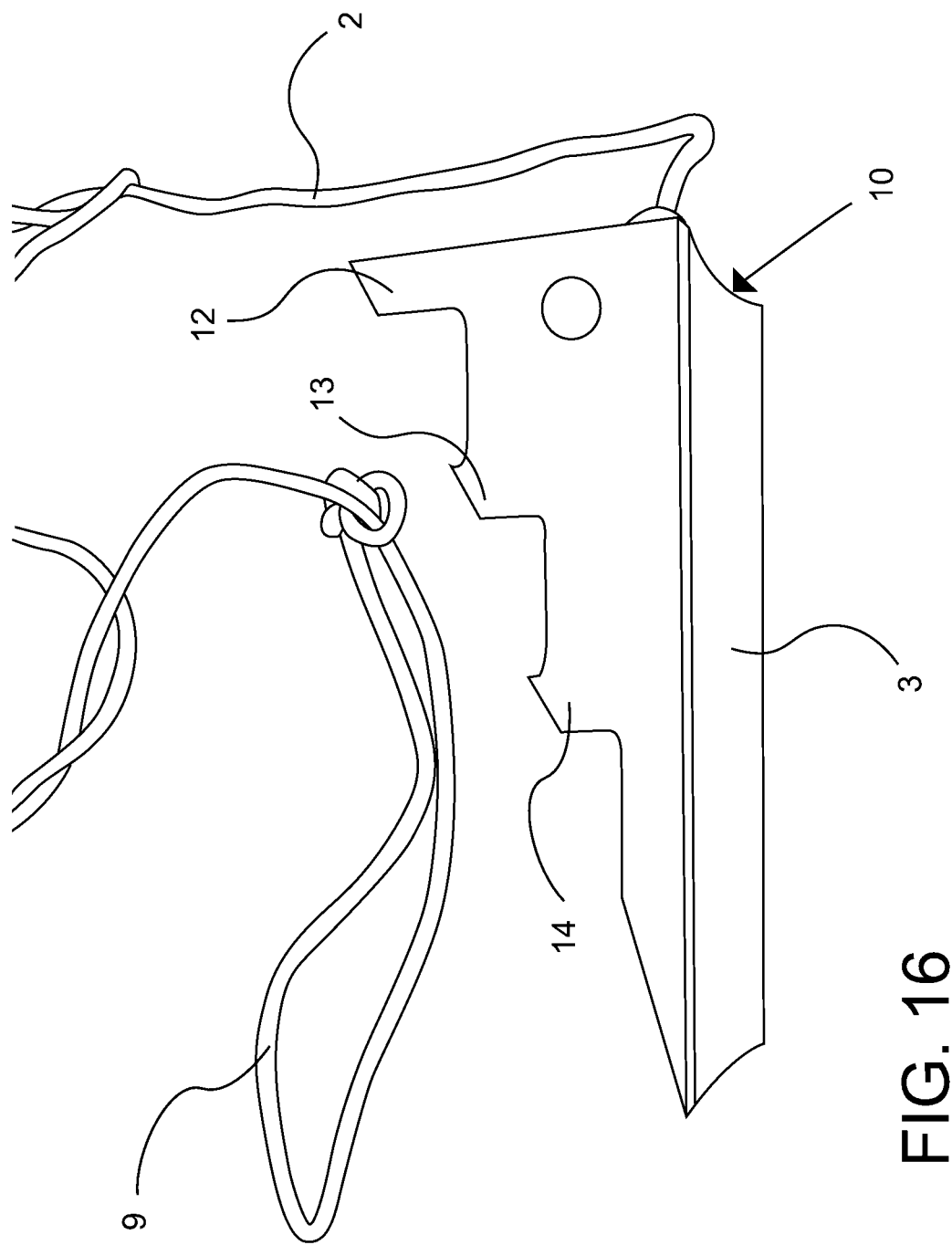
Figure 17:
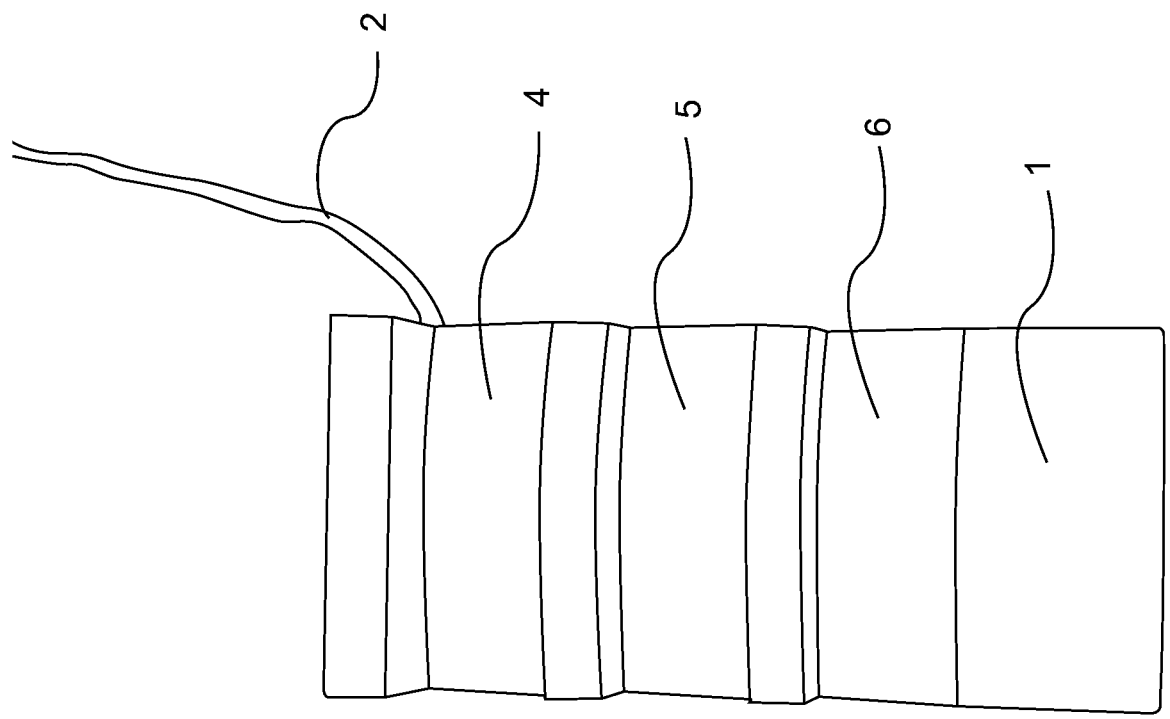
Figure 18:
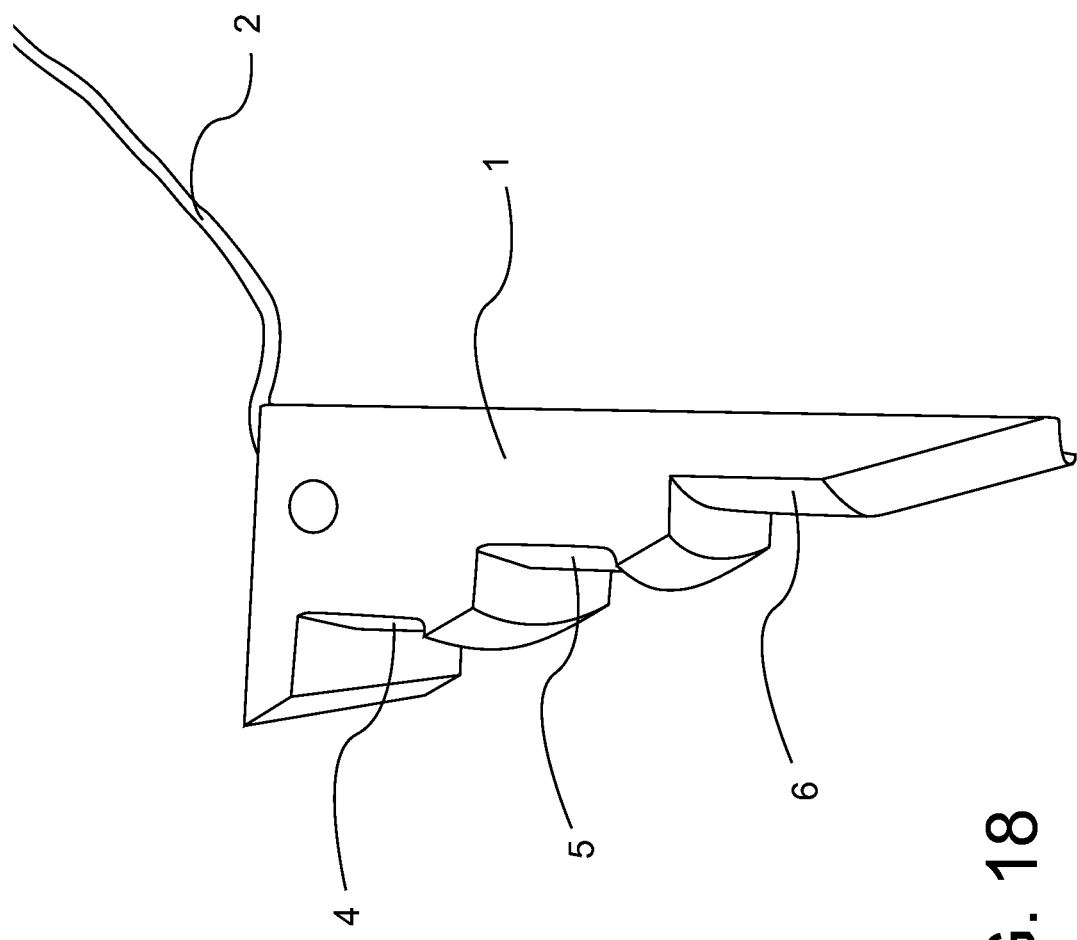
Figure 19:
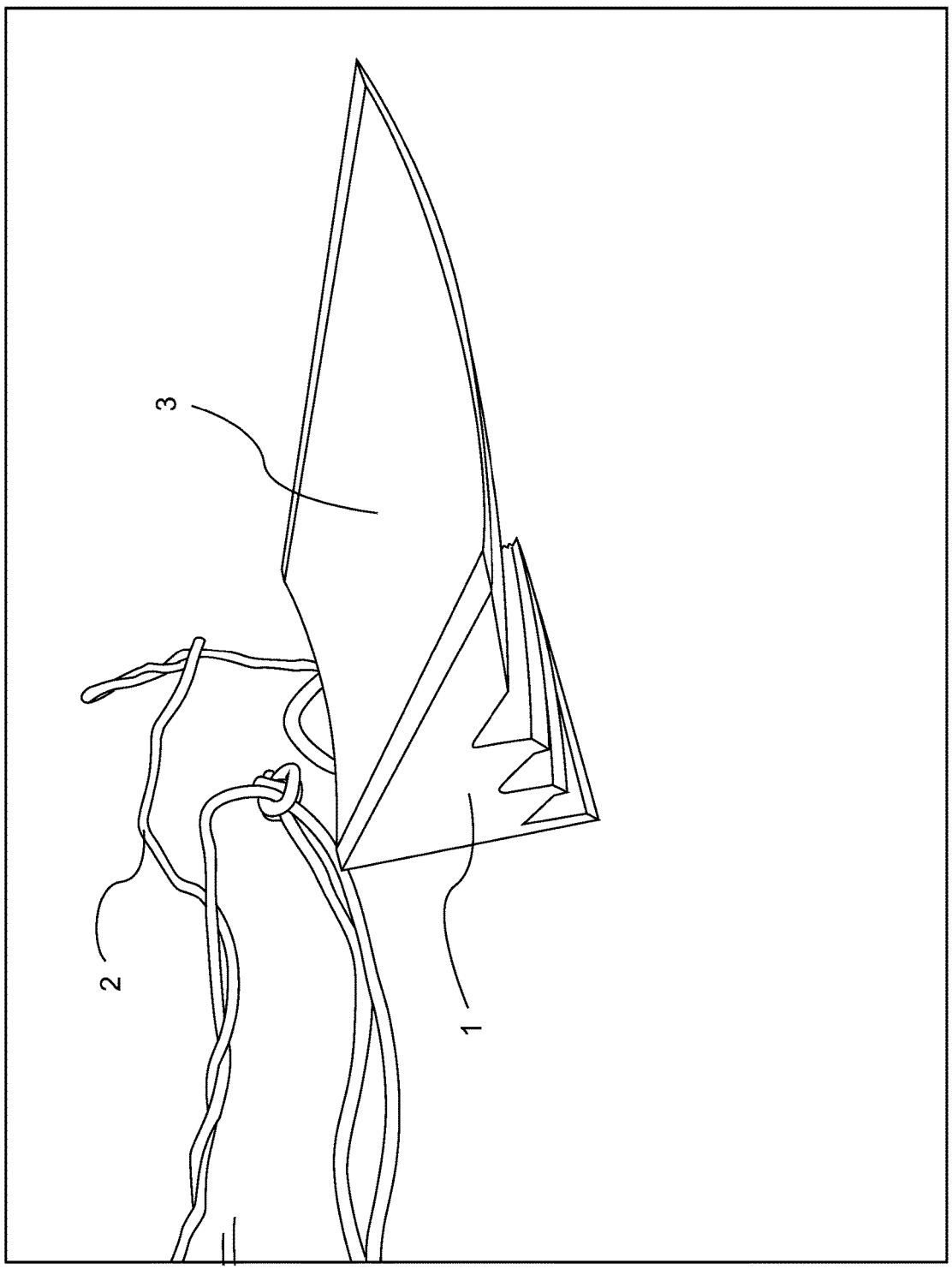
Figure 20:
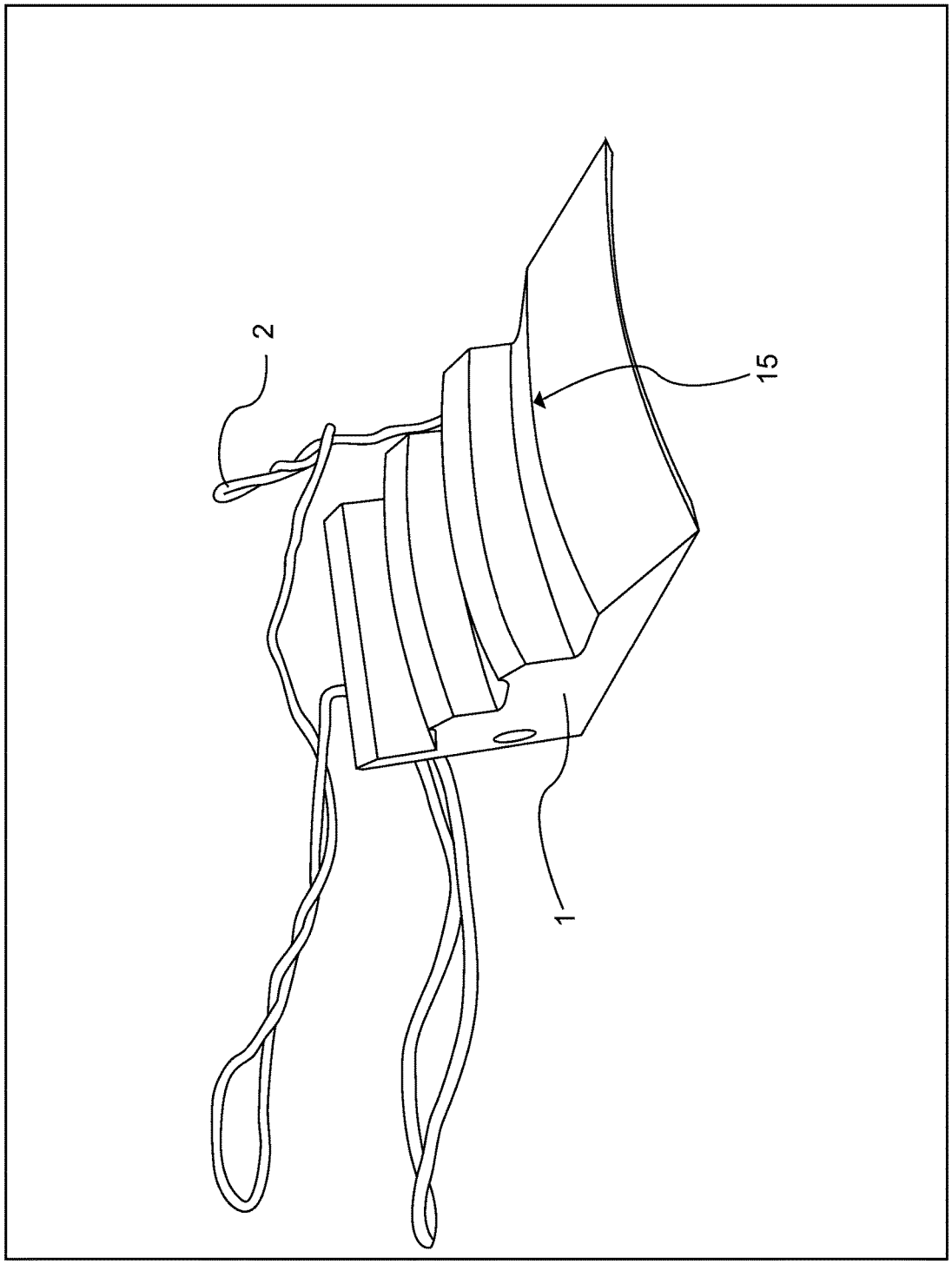

FIGS. 15 to 20 show additional views of the hunting tree stand adjustment device 1. In FIG. 16, the curvature 10 of the contact surface 3 can be more easily seen. The contact surface 3 is smooth with a shallow, concave curve or curvature 10. The shallow, concave curve is designed to accommodate or approximately follow the convex curve of a trunk of a tree. In addition, in accordance with at least one possible exemplification, a loop 9 is positioned at the end of the cord 2 of the hunting tree stand adjustment device 1. The loop 9 is generally sized so that most tree stand users may be able to fit the cord 2 over their wrist during use. The loop 9 is designed so that if the user were to release their grip on the hunting tree stand adjustment device 1, the hunting tree stand adjustment device 1 is not likely to fall, or drop, from the height of the user to the ground. This user might then have to descend back down the tree, retrieve the hunting tree stand adjustment device 1, and ascend the tree again.

Figure 21:
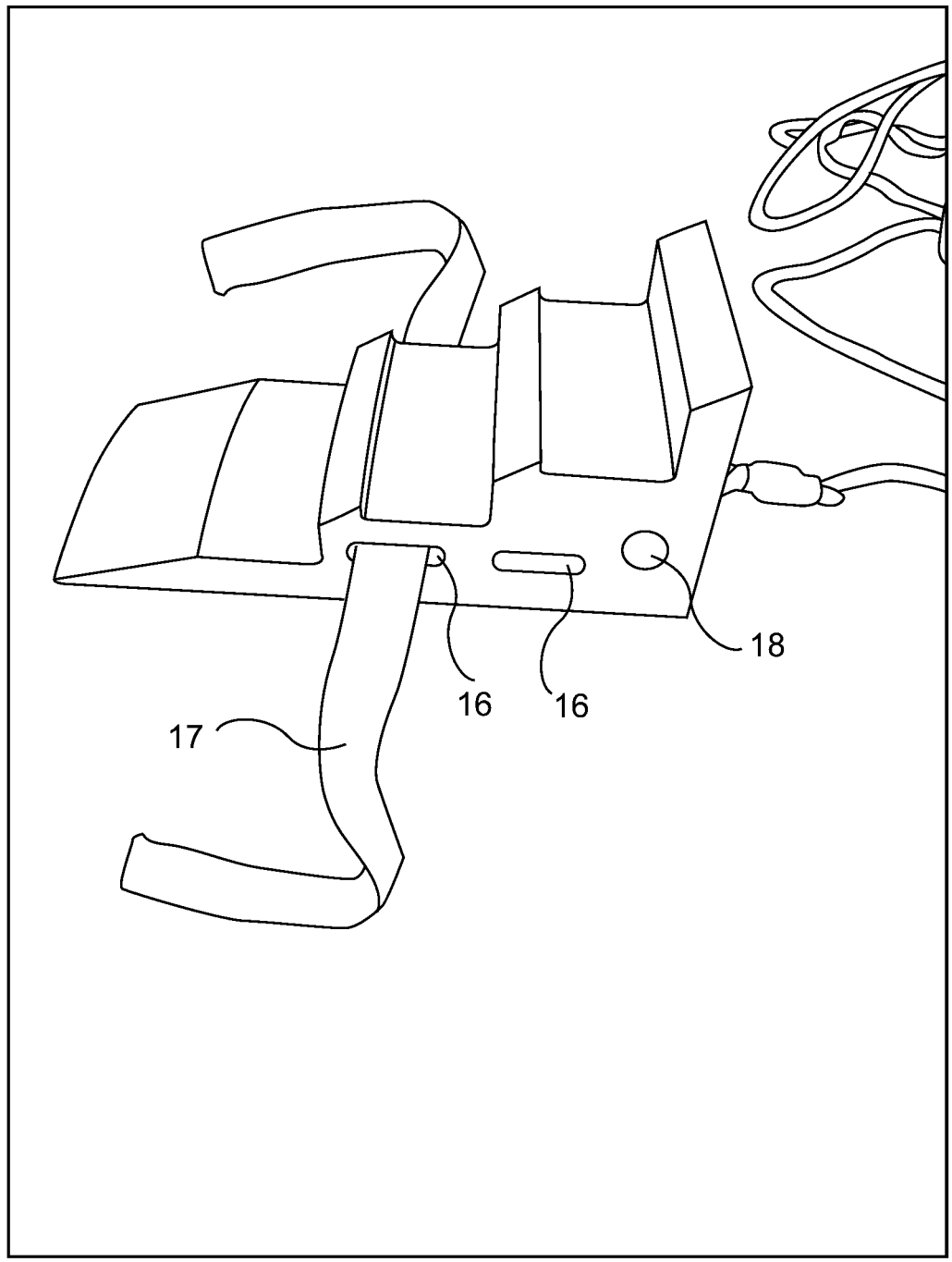
FIG. 21 shows another possible exemplification of a hunting tree stand adjustment device.

FIG. 21 shows an additional exemplification of a hunting tree stand adjustment device 18. This exemplification is essentially identical to the hunting tree stand adjustment device 1, except that the hunting tree stand adjustment device 18 shown in FIG. 21 includes two slots 16 that run through the body of the hunting tree stand adjustment device 18. These slots or openings 16 are included to allow a securing strip or strips 17, such as a Velcro® strip or similar securing structure, to be inserted or run through the hunting tree stand adjustment device 18. The securing strip 17 is used to secure the hunting tree stand adjustment device 18 to the seat portion 22 or platform portion 23 of the climbing tree stand 21, or possibly to the hunter 20 himself, such as his clothing or one of his limbs, for ease of transport of the hunting tree stand adjustment device 18, both on the ground or while climbing the tree. In this manner, the hunting tree stand adjustment device 18 can be secured to allow the hunter's hands to be free. Alternatively, the cord 2 can be used to wrap around and secure the hunting tree stand adjustment device 1 to the climbing tree stand 21 or the hunter 20 until the hunter 20 is ready to use the hunting tree stand adjustment device 1.

In at least one possible embodiment, the contact surface 3 has a width and a length greater than the width. The length, as measured from the intersecting edge of the contact surface 3 and the cord surface 7 to the edge of the sloped portion 11, is in the range of approximately six to nine inches, such as seven or seven and a half inches, including values in the tenths and hundredths of an inch. The width, as measured from one elongated edge of the contact surface 3 to the other, is in the range of approximately two to five inches, such as three or three and a half inches, including values in the tenths and hundredths of an inch. In at least one possible embodiment, the end or cord surface 7 has a width and a thickness or height. The thickness or height of the cord surface 7, as measured from the intersecting edge of the contact surface 3 and the cord surface 7 to the edge of the projection 12, is in the range of approximately two to six inches, such as three or three and a half inches, including values in the tenths and hundredths of an inch. The width of the cord surface, as measured from one side edge to the other, is in the range of approximately two to five inches, such as three or three and a half inches, including values in the tenths and hundredths of an inch. The thickness 4W, in at least one possible embodiment, is in the range of approximately two to five inches, such as two or two and a half inches, including values in the tenths and hundredths of an inch. The thickness 5W, in at least one possible embodiment, is in the range of approximately one to four inches, such as one or one and a half inches, including values in the tenths and hundredths of an inch. The thickness 6W, in at least one possible embodiment, is in the range of approximately one quarter of an inch or one half of an inch to two inches, including values in the tenths and hundredths of an inch. It should be noted that all of these measurements or dimensions are according to at least one possible embodiment, and different dimensions outside of these ranges and different combinations of dimensions are possible and to be understood as forming part of the disclosure.

U.S. Application 62/772,409, filed Nov. 28, 2018, is incorporated by reference as if set forth in its entirety herein.

One feature or aspect of an exemplification is believed at the time of the filing of this patent application to possibly reside broadly in an adjustable hunting climbing tree stand, said climbing tree stand comprising: a seat portion being configured to be sat upon by a hunter during a hunting session in a tree; a platform portion being separate from said seat portion and being configured to be stood upon by a hunter during a hunting session in a tree; said seat portion comprising a first support frame comprising: a first bracing section configured to engage or brace against a tree trunk; a first free section configured to project out and away from a tree trunk; and a seat or cushion attached to said first free section; said seat portion comprising a first strap device configured to be wrapped around a tree trunk to connect said seat portion to the tree trunk; said first strap device being adjustable in length to adjust the orientation of said seat portion with respect to the tree trunk and the ground; said platform portion comprising a second support frame comprising: a second bracing section configured to engage or brace against a tree trunk; and a second free section configured to project out and away from a tree trunk; said platform portion comprising a second strap device configured to be wrapped around a tree trunk to connect said platform portion to the tree trunk; said second strap device being adjustable in length to adjust the orientation of said platform portion with respect to the tree trunk and the ground; a hunting tree stand adjustment device and a cord connected thereto; said hunting tree stand adjustment device being configured to permit adjustment of the orientation of said platform portion upon said platform portion being disposed at a desired height on a tree trunk; said hunting tree stand adjustment device comprising a substantially wedge-shaped body; said body comprising: a contact surface being substantially smooth and substantially rectangular, and comprising a concave curvature configured to substantially match or follow a curved outer surface of a tree trunk; two side surfaces being substantially triangular and disposed essentially perpendicular to said contact surface; an end surface being substantially square and disposed essentially perpendicular to each of said contact surface and said side surfaces; and an angled surface portion being generally disposed at an acute angle with respect to said contact surface, and being disposed to face opposite said contact surface; said angled surface portion comprising a plurality of grooves formed therein, such that said body comprises alternating grooves and projections at said angled surface portion; said plurality of grooves comprising a first groove, a second groove, and a third groove; said body comprising a first thickness at said first groove, a second thickness at said second groove, and a third thickness at said third groove, wherein said first thickness is largest and greater than each of said second and third thicknesses, and said second thickness is next largest and greater than said third thickness; said body being configured to be inserted between a tree trunk and said second strap device of said platform portion in order to permit a hunter, upon the hunter being at a desired height on the tree trunk for hunting, to adjust the orientation of said platform portion with respect to the tree trunk, such that said platform portion is essentially level with respect to the ground or horizontal; said cord being configured to permit a hunter to lower said body by hand in between the tree trunk and said second strap device upon the hunter using his legs to move said platform portion to create space between said second strap device and the tree trunk; said contact surface, upon insertion of said body between said second strap device and the tree trunk, being configured to be in contact with the tree trunk; each of said first, second, and third grooves being configured to receive and be engaged by a portion of said second strap device upon insertion of said body between said second strap device and the tree trunk to permit a hunter to select a desired adjustment of the orientation of said platform portion from three different possible adjustments without having to adjust the length of said second strap device; and said body being made of a material sufficiently strong and durable to hold said platform portion in a desired position and orientation on the tree trunk upon a hunter standing on said platform portion and exerting a substantial pressing force on said body via said second strap device.

Another feature or aspect of an exemplification is believed at the time of the filing of this patent application to possibly reside broadly in the adjustable hunting climbing tree stand, wherein: said hunting tree stand adjustment device comprises a securing device configured to secure said body of said hunting tree stand adjustment device to said seat portion or said platform portion or the hunter; said securing device comprises a strip-shaped structure; and said body comprises at least one opening formed therein configured to receive said strip-shaped structure.

Yet another feature or aspect of an exemplification is believed at the time of the filing of this patent application to possibly reside broadly in the adjustable hunting climbing tree stand, wherein: each of said first, second, and third grooves comprises a contact surface configured to be contacted by said second strap device of said platform portion; and said contact surface of each of said first, second, and third grooves comprises a smooth, curved surface.

Still another feature or aspect of an exemplification is believed at the time of the filing of this patent application to possibly reside broadly in a method of using the adjustable hunting climbing tree stand according, said method comprising: placing said seat portion on a tree trunk by wrapping said first strap device around the tree trunk and bracing said first bracing section against the tree trunk; adjusting the length of said first strap device of said seat portion to adjust the orientation of said seat portion with respect to the tree trunk and the ground; placing said platform portion on a tree trunk by wrapping said second strap device around the tree trunk and bracing said second bracing section against the tree trunk; adjusting the length of said second strap device of said seat portion to adjust the orientation of said platform portion with respect to the tree trunk and the ground; placing one's body on said seat portion and then moving said platform portion up to a higher platform position on the tree trunk using one's feet and legs; standing on said platform portion at the higher platform position and then moving said seat portion up to a higher seat position on the tree trunk using one's hands; repeating alternately moving said platform portion and said seat portion until said adjustable climbing tree stand is disposed on the tree trunk at a desired height suitable for hunting; and upon said platform portion being disposed at the desired height and not being essentially level with respect to the ground or horizontal, adjusting, using said hunting tree stand adjustment device, the orientation of said platform portion with respect to the tree trunk, such that said platform portion is essentially level with respect to the ground or horizontal, said step of adjusting comprising: grasping said cord with one's hands and placing said wedge-shaped body adjacent the tree trunk with said curved, contact surface facing a curved outer surface of the tree trunk; selecting one of said first, second, and third thicknesses that corresponds to the desired adjustment of said platform portion sufficient to place said platform portion essentially level with respect to the ground or horizontal; placing one's weight on said seat portion and lifting said platform portion with one's legs and feet and thereby creating space between said second strap device and the tree trunk; lowering, using said cord, said body into the space between said second strap device and the tree trunk; stopping lowering of said body upon said second strap device being aligned with the groove of said first, second, and third grooves that corresponds to the selected thickness; and moving said platform portion back with one's legs and feet and moving said second strap device into the selected one of said first, second, and third grooves to bring said second strap device into pressing engagement with said body, and thereby securing said platform portion in an adjusted position in which said platform portion is essentially level with respect to the ground or horizontal.

A further feature or aspect of an exemplification is believed at the time of the filing of this patent application to possibly reside broadly in the method of using the adjustable hunting climbing tree stand, wherein: said hunting tree stand adjustment device comprises a securing device configured to secure said body of said hunting tree stand adjustment device to said seat portion or said platform portion or the hunter; said securing device comprises a strip-shaped structure; and said body comprises at least one opening formed therein configured to receive said strip-shaped structure; and said method further comprises transporting said body of said hunting tree stand adjustment device while climbing the tree trunk by first securing, using said securing device, said body to said seat portion or said platform portion or the hunter prior to climbing the tree trunk.

Another feature or aspect of an exemplification is believed at the time of the filing of this patent application to possibly reside broadly in the method of using the adjustable hunting climbing tree stand, wherein: each of said first, second, and third grooves comprises a contact surface configured to be contacted by said second strap device of said platform portion; and said contact surface of each of said first, second, and third grooves comprises a smooth, curved surface.

Yet another feature or aspect of an exemplification is believed at the time of the filing of this patent application to possibly reside broadly in an adjustable hunting climbing tree stand, said climbing tree stand comprising: a seat portion being configured to be sat upon by a hunter during a hunting session in a tree; a platform portion being separate from said seat portion and being configured to be stood upon by a hunter during a hunting session in a tree; said seat portion comprising a first strap device configured to be wrapped around a tree trunk to connect said seat portion to the tree trunk; said first strap device being adjustable in length to adjust the orientation of said seat portion with respect to the tree trunk and the ground; said platform portion comprising a second strap device configured to be wrapped around a tree trunk to connect said platform portion to the tree trunk; said second strap device being adjustable in length to adjust the orientation of said platform portion with respect to the tree trunk and the ground; a hunting tree stand adjustment device and a cord connected thereto; said hunting tree stand adjustment device being configured to permit adjustment of the orientation of said platform portion upon said platform portion being disposed at a desired height on a tree trunk; said hunting tree stand adjustment device comprising a substantially wedge-shaped body; said body comprising: a contact surface being configured to contact an outer surface of a tree trunk; two side surfaces being disposed transverse to said contact surface; an end surface being disposed transverse to each of said contact surface and said side surfaces; and an adjustment surface portion being disposed to face opposite and away from said contact surface; said adjustment surface portion comprising at least two adjustment surfaces, wherein said at least two adjustment surfaces comprising a first adjustment surface and a second adjustment surface; said body comprising at least two thicknesses of differing size, wherein said at least two thicknesses comprising a first thickness at said first adjustment surface and a second thickness at said second adjustment surface; said body being configured to be inserted between a tree trunk and said second strap device of said platform portion in order to permit a hunter, upon the hunter being at a desired height on the tree trunk for hunting, to adjust the orientation of said platform portion with respect to the tree trunk, such that said platform portion is essentially level with respect to the ground or horizontal; said cord being configured to permit a hunter to lower said body by hand in between the tree trunk and said second strap device; and each of said first and second adjustment surfaces being configured to be engaged by a portion of said second strap device upon insertion of said body between said second strap device and the tree trunk to permit a hunter to select a desired adjustment of the orientation of said platform portion corresponding to said first and second thicknesses.

Still another feature or aspect of an exemplification is believed at the time of the filing of this patent application to possibly reside broadly in a method of using the adjustable hunting climbing tree stand, said method comprising: placing said seat portion on a tree trunk by wrapping said first strap device around the tree trunk and bracing said seat portion against the tree trunk; adjusting the length of said first strap device of said seat portion to adjust the orientation of said seat portion with respect to the tree trunk and the ground; placing said platform portion on a tree trunk by wrapping said second strap device around the tree trunk and bracing said platform portion against the tree trunk; adjusting the length of said second strap device of said seat portion to adjust the orientation of said platform portion with respect to the tree trunk and the ground; placing one's body on said seat portion and then moving said platform portion up to a higher platform position on the tree trunk using one's feet and legs; standing on said platform portion at the higher platform position and then moving said seat portion up to a higher seat position on the tree trunk using one's hands; repeating alternately moving said platform portion and said seat portion until said adjustable climbing tree stand is disposed on the tree trunk at a desired height suitable for hunting; and upon said platform portion being disposed at the desired height and not being essentially level with respect to the ground or horizontal, adjusting, using said hunting tree stand adjustment device, the orientation of said platform portion with respect to the tree trunk, such that said platform portion is essentially level with respect to the ground or horizontal, said step of adjusting comprising: grasping said cord with one's hands and placing said wedge-shaped body adjacent the tree trunk with said contact surface facing the tree trunk; selecting one of said first and second thicknesses that corresponds to the desired adjustment of said platform portion sufficient to place said platform portion essentially level with respect to the ground or horizontal; placing one's weight on said seat portion and lifting said platform portion with one's legs and feet and thereby creating space between said second strap device and the tree trunk; lowering, using said cord, said body into the space between said second strap device and the tree trunk; stopping lowering of said body upon said second strap device being aligned with said first or second adjustment surfaces that corresponds to the selected thickness; and moving said platform portion back with one's legs and feet and moving said second strap device into engagement with the selected one of said first or second adjustment surfaces, and thereby securing said platform portion in an adjusted position in which said platform portion is essentially level with respect to the ground or horizontal.

A further feature or aspect of an exemplification is believed at the time of the filing of this patent application to possibly reside broadly in a hunting tree stand adjustment device comprising: a substantially wedge-shaped body; an elongated lowering device being connected to said body; said body comprising: a contact surface being configured to contact an outer surface of a tree trunk; two side surfaces being disposed transverse to said contact surface; an end surface being disposed transverse to each of said contact surface and said side surfaces; and an adjustment surface portion being disposed to face opposite and away from said contact surface; said adjustment surface portion comprising at least two adjustment surfaces, wherein said at least two adjustment surfaces comprising a first adjustment surface and a second adjustment surface; said body comprising at least two thicknesses of differing size, wherein said at least two thicknesses comprising a first thickness at said first adjustment surface and a second thickness at said second adjustment surface; said body being configured to be inserted between a tree trunk and a strap device of a platform portion of a climbing tree stand in order to permit a hunter, upon the hunter being at a desired height on the tree trunk for hunting, to adjust the orientation of the platform portion with respect to the tree trunk, such that the platform portion is essentially level with respect to the ground or horizontal; said elongated lowering device being configured to permit a hunter to lower said body by hand in between the tree trunk and the strap device; and each of said first and second adjustment surfaces being configured to be engaged by a portion of the strap device upon insertion of said body between the strap device and the tree trunk to permit a hunter to select a desired adjustment of the orientation of the platform portion corresponding to said first and second thicknesses.

Another feature or aspect of an exemplification is believed at the time of the filing of this patent application to possibly reside broadly in the hunting tree stand adjustment device, wherein: said hunting tree stand adjustment device comprises a securing device configured to secure said body of said hunting tree stand adjustment device to a portion of a climbing tree stand or a hunter; said securing device comprises a strip-shaped structure; and said body comprises at least one opening formed therein configured to receive said strip-shaped structure.

Yet another feature or aspect of an exemplification is believed at the time of the filing of this patent application to possibly reside broadly in the hunting tree stand adjustment device, wherein each of said first and second adjustment surfaces comprises a smooth, curved surface.

Still another feature or aspect of an exemplification is believed at the time of the filing of this patent application to possibly reside broadly in the hunting tree stand adjustment device, wherein: said at least two adjustment surfaces comprise a third adjustment surface; said at least two thicknesses comprise a third thickness at said third adjustment surface; and said first thickness is greater than said second thickness, and said second thickness is greater than said third thickness.

A further feature or aspect of an exemplification is believed at the time of the filing of this patent application to possibly reside broadly in a method of using the hunting tree stand adjustment device, upon a hunter being at a desired height in a tree on a platform portion of a climbing tree stand that is not essentially level with respect to the ground or horizontal, said method comprising: grasping said cord with one's hands and placing said wedge-shaped body adjacent the tree trunk with said contact surface facing the tree trunk; selecting one of said first and second thicknesses that corresponds to the desired adjustment of a platform portion sufficient to place the platform portion essentially level with respect to the ground or horizontal; creating space between a strap device of the platform portion and the tree trunk; lowering, using said elongated lowering device, said body into the space between the strap device and the tree trunk; stopping lowering of said body upon the strap device being aligned with said first or second adjustment surfaces that corresponds to the selected thickness; and moving the strap device into engagement with the selected one of said first or second adjustment surfaces, and thereby placing the platform portion in an adjusted position in which the platform portion is essentially level with respect to the ground or horizontal.

Yet another feature or aspect of an exemplification is believed at the time of the filing of this patent application to possibly reside broadly in the method of using the hunting tree stand adjustment device, wherein: said hunting tree stand adjustment device comprises a securing device configured to secure said body of said hunting tree stand adjustment device to said seat portion or said platform portion or the hunter; said securing device comprises a strip-shaped structure; and said body comprises at least one opening formed therein configured to receive said strip-shaped structure; and said method further comprises transporting said body of said hunting tree stand adjustment device while climbing the tree trunk by first securing, using said securing device, said body to a portion of a climbing tree stand or a hunter prior to climbing the tree trunk.

Still another feature or aspect of an exemplification is believed at the time of the filing of this patent application to possibly reside broadly in the method of using the hunting tree stand adjustment device, wherein each of said first and second adjustment surface comprises a smooth, curved surface.

A further feature or aspect of an exemplification is believed at the time of the filing of this patent application to possibly reside broadly in the method of using the hunting tree stand adjustment device, wherein: said at least two adjustment surfaces comprise a third adjustment surface; said at least two thicknesses comprise a third thickness at said third adjustment surface; said first thickness is greater than said second thickness, and said second thickness is greater than said third thickness; and said step of selecting one of said first and second thicknesses comprises selecting one of said first, second, and third thicknesses that corresponds to the desired adjustment of a platform portion sufficient to place the platform portion essentially level with respect to the ground or horizontal.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

While various aspects and exemplifications have been disclosed herein, other aspects and exemplifications are contemplated. The various aspects and exemplifications disclosed herein are for purposes of illustration and not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. An adjustable hunting climbing tree stand, said climbing tree stand comprising:
    a seat portion being configured to be sat upon by a hunter during a hunting session in a tree;
    a platform portion being separate from said seat portion and being configured to be stood upon by a hunter during a hunting session in a tree;
    said seat portion comprising a first support frame comprising:
        a first bracing section configured to engage or brace against a tree trunk;
        a first free section configured to project out and away from a tree trunk; and
        a seat or cushion attached to said first free section;
    said seat portion comprising a first strap device configured to be wrapped around a tree trunk to connect said seat portion to the tree trunk;
    said first strap device being adjustable in length to adjust the orientation of said seat portion with respect to the tree trunk and the ground;
    said platform portion comprising a second support frame comprising:
        a second bracing section configured to engage or brace against a tree trunk; and
        a second free section configured to project out and away from a tree trunk;
    said platform portion comprising a second strap device configured to be wrapped around a tree trunk to connect said platform portion to the tree trunk;
    said second strap device being adjustable in length to adjust the orientation of said platform portion with respect to the tree trunk and the ground;
    a hunting tree stand adjustment device and a cord connected thereto;
    said hunting tree stand adjustment device being configured to permit adjustment of the orientation of said platform portion upon said platform portion being disposed at a desired height on a tree trunk;
    said hunting tree stand adjustment device comprising a substantially wedge-shaped body;
    said body comprising:
        a contact surface being substantially smooth and substantially rectangular, and comprising a concave curvature configured to substantially match or follow a curved outer surface of a tree trunk;
        two side surfaces being substantially triangular and disposed essentially perpendicular to said contact surface;
        an end surface being substantially square and disposed essentially perpendicular to each of said contact surface and said side surfaces; and
        an angled surface portion being generally disposed at an acute angle with respect to said contact surface, and being disposed to face opposite said contact surface;
    said angled surface portion comprising a plurality of grooves formed therein, such that said body comprises alternating grooves and projections at said angled surface portion;
    said plurality of grooves comprising a first groove, a second groove, and a third groove;
    said body comprising a first thickness at said first groove, a second thickness at said second groove, and a third thickness at said third groove, wherein said first thickness is largest and greater than each of said second and third thicknesses, and said second thickness is next largest and greater than said third thickness;
    said body being configured to be inserted between a tree trunk and said second strap device of said platform portion in order to permit a hunter, upon the hunter being at a desired height on the tree trunk for hunting, to adjust the orientation of said platform portion with respect to the tree trunk, such that said platform portion is essentially level with respect to the ground or horizontal;
    said cord being configured to permit a hunter to lower said body by hand in between the tree trunk and said second strap device upon the hunter using his legs to move said platform portion to create space between said second strap device and the tree trunk;
    said contact surface, upon insertion of said body between said second strap device and the tree trunk, being configured to be in contact with the tree trunk;
    each of said first, second, and third grooves being configured to receive and be engaged by a portion of said second strap device upon insertion of said body between said second strap device and the tree trunk to permit a hunter to select a desired adjustment of the orientation of said platform portion from three different possible adjustments without having to adjust the length of said second strap device; and
    said body being made of a material sufficiently strong and durable to hold said platform portion in a desired position and orientation on the tree trunk upon a hunter standing on said platform portion and exerting a substantial pressing force on said body via said second strap device.

2. The adjustable hunting climbing tree stand according to claim 1, wherein:
    said hunting tree stand adjustment device comprises a securing device configured to secure said body of said hunting tree stand adjustment device to said seat portion or said platform portion or the hunter;
    said securing device comprises a strip-shaped structure; and said body comprises at least one opening formed therein configured to receive said strip-shaped structure.

3. The adjustable hunting climbing tree stand according to claim 1, wherein:
each of said first, second, and third grooves comprises a contact surface configured to be contacted by said second strap device of said platform portion; and
said contact surface of each of said first, second, and third grooves comprises a smooth, curved surface.

4. A method of using the adjustable hunting climbing tree stand according to claim 1, said method comprising:
placing said seat portion on a tree trunk by wrapping said first strap device around the tree trunk and bracing said first bracing section against the tree trunk;
adjusting the length of said first strap device of said seat portion to adjust the orientation of said seat portion with respect to the tree trunk and the ground;
placing said platform portion on a tree trunk by wrapping said second strap device around the tree trunk and bracing said second bracing section against the tree trunk;
adjusting the length of said second strap device of said seat portion to adjust the orientation of said platform portion with respect to the tree trunk and the ground;
placing one's body on said seat portion and then moving said platform portion up to a higher platform position on the tree trunk using one's feet and legs;
standing on said platform portion at the higher platform position and then moving said seat portion up to a higher seat position on the tree trunk using one's hands;
repeating alternately moving said platform portion and said seat portion until said adjustable climbing tree stand is disposed on the tree trunk at a desired height suitable for hunting; and
upon said platform portion being disposed at the desired height and not being essentially level with respect to the ground or horizontal, adjusting, using said hunting tree stand adjustment device, the orientation of said platform portion with respect to the tree trunk, such that said platform portion is essentially level with respect to the ground or horizontal, said step of adjusting comprising:
grasping said cord with one's hands and placing said wedge-shaped body adjacent the tree trunk with said curved, contact surface facing a curved outer surface of the tree trunk;
selecting one of said first, second, and third thicknesses that corresponds to the desired adjustment of said platform portion sufficient to place said platform portion essentially level with respect to the ground or horizontal;
placing one's weight on said seat portion and lifting said platform portion with one's legs and feet and thereby creating space between said second strap device and the tree trunk;
lowering, using said cord, said body into the space between said second strap device and the tree trunk;
stopping lowering of said body upon said second strap device being aligned with the groove of said first, second, and third grooves that corresponds to the selected thickness; and
moving said platform portion back with one's legs and feet and moving said second strap device into the selected one of said first, second, and third grooves to bring said second strap device into pressing engagement with said body, and thereby securing said platform portion in an adjusted position in which said platform portion is essentially level with respect to the ground or horizontal.

5. The method according to claim 4, wherein:
said hunting tree stand adjustment device comprises a securing device configured to secure said body of said hunting tree stand adjustment device to said seat portion or said platform portion or the hunter;
said securing device comprises a strip-shaped structure; and
said body comprises at least one opening formed therein configured to receive said strip-shaped structure; and
said method further comprises transporting said body of said hunting tree stand adjustment device while climbing the tree trunk by first securing, using said securing device, said body to said seat portion or said platform portion or the hunter prior to climbing the tree trunk.

6. The method according to claim 4, wherein:
each of said first, second, and third grooves comprises a contact surface configured to be contacted by said second strap device of said platform portion; and
said contact surface of each of said first, second, and third grooves comprises a smooth, curved surface.

7. An adjustable hunting climbing tree stand, said climbing tree stand comprising:
a seat portion being configured to be sat upon by a hunter during a hunting session in a tree;
a platform portion being separate from said seat portion and being configured to be stood upon by a hunter during a hunting session in a tree;
said seat portion comprising a first strap device configured to be wrapped around a tree trunk to connect said seat portion to the tree trunk;
said first strap device being adjustable in length to adjust the orientation of said seat portion with respect to the tree trunk and the ground;
said platform portion comprising a second strap device configured to be wrapped around a tree trunk to connect said platform portion to the tree trunk;
said second strap device being adjustable in length to adjust the orientation of said platform portion with respect to the tree trunk and the ground;
a hunting tree stand adjustment device and a cord connected thereto;
said hunting tree stand adjustment device being configured to permit adjustment of the orientation of said platform portion upon said platform portion being disposed at a desired height on a tree trunk;
said hunting tree stand adjustment device comprising a substantially wedge-shaped body;
said body comprising:
a contact surface being configured to contact an outer surface of a tree trunk;
two side surfaces being disposed transverse to said contact surface;
an end surface being disposed transverse to each of said contact surface and said side surfaces; and
an adjustment surface portion being disposed to face opposite and away from said contact surface;
said adjustment surface portion comprising at least two adjustment surfaces, wherein said at least two adjustment surfaces comprising a first adjustment surface and a second adjustment surface;
said body comprising at least two thicknesses of differing size, wherein said at least two thicknesses comprising a first thickness at said first adjustment surface and a second thickness at said second adjustment surface;

said body being configured to be inserted between a tree trunk and said second strap device of said platform portion in order to permit a hunter, upon the hunter being at a desired height on the tree trunk for hunting, to adjust the orientation of said platform portion with respect to the tree trunk, such that said platform portion is essentially level with respect to the ground or horizontal;

said cord being configured to permit a hunter to lower said body by hand in between the tree trunk and said second strap device; and each of said first and second adjustment surfaces being configured to be engaged by a portion of said second strap device upon insertion of said body between said second strap device and the tree trunk to permit a hunter to select a desired adjustment of the orientation of said platform portion corresponding to said first and second thicknesses.

8. The adjustable hunting climbing tree stand according to claim 7, wherein:

said hunting tree stand adjustment device comprises a securing device configured to secure said body of said hunting tree stand adjustment device to said seat portion or said platform portion or the hunter;

said securing device comprises a strip-shaped structure; and said body comprises at least one opening formed therein configured to receive said strip-shaped structure.

9. The adjustable hunting climbing tree stand according to claim 7, wherein each of said first and second adjustment surfaces comprises a smooth, curved surface.

10. A method of using the adjustable hunting climbing tree stand according to claim 7, said method comprising:

placing said seat portion on a tree trunk by wrapping said first strap device around the tree trunk and bracing said seat portion against the tree trunk;

adjusting the length of said first strap device of said seat portion to adjust the orientation of said seat portion with respect to the tree trunk and the ground;

placing said platform portion on a tree trunk by wrapping said second strap device around the tree trunk and bracing said platform portion against the tree trunk;

adjusting the length of said second strap device of said seat portion to adjust the orientation of said platform portion with respect to the tree trunk and the ground;

placing one's body on said seat portion and then moving said platform portion up to a higher platform position on the tree trunk using one's feet and legs;

standing on said platform portion at the higher platform position and then moving said seat portion up to a higher seat position on the tree trunk using one's hands;

repeating alternately moving said platform portion and said seat portion until said adjustable climbing tree stand is disposed on the tree trunk at a desired height suitable for hunting; and upon said platform portion being disposed at the desired height and not being essentially level with respect to the ground or horizontal, adjusting, using said hunting tree stand adjustment device, the orientation of said platform portion with respect to the tree trunk, such that said platform portion is essentially level with respect to the ground or horizontal, said step of adjusting comprising:

grasping said cord with one's hands and placing said wedge-shaped body adjacent the tree trunk with said contact surface facing the tree trunk;

selecting one of said first and second thicknesses that corresponds to the desired adjustment of said platform portion sufficient to place said platform portion essentially level with respect to the ground or horizontal;

placing one's weight on said seat portion and lifting said platform portion with one's legs and feet and thereby creating space between said second strap device and the tree trunk;

lowering, using said cord, said body into the space between said second strap device and the tree trunk;

stopping lowering of said body upon said second strap device being aligned with said first or second adjustment surfaces that corresponds to the selected thickness; and moving said platform portion back with one's legs and feet and moving said second strap device into engagement with the selected one of said first or second adjustment surfaces, and thereby securing said platform portion in an adjusted position in which said platform portion is essentially level with respect to the ground or horizontal.

11. The method according to claim 10, wherein:

said hunting tree stand adjustment device comprises a securing device configured to secure said body of said hunting tree stand adjustment device to said seat portion or said platform portion or the hunter;

said securing device comprises a strip-shaped structure; and said body comprises at least one opening formed therein configured to receive said strip-shaped structure; and said method further comprises transporting said body of said hunting tree stand adjustment device while climbing the tree trunk by first securing, using said securing device, said body to said seat portion or said platform portion or the hunter prior to climbing the tree trunk.

12. The method according to claim 10, wherein each of said first and second adjustment surface comprises a smooth, curved surface.

13. In an adjustable hunting climbing tree stand comprising a seat portion to be sat upon by a hunter and a separate platform portion to be stood upon by a hunter, each comprising an adjustable strap device, a hunting tree stand adjustment device comprising:

a substantially wedge-shaped body;

an elongated lowering device being connected to said body;

said body comprising:

a contact surface being configured to contact an outer surface of a tree trunk;

two side surfaces being disposed transverse to said contact surface;

an end surface being disposed transverse to each of said contact surface and said side surfaces; and an adjustment surface portion being disposed to face opposite and away from said contact surface;

said adjustment surface portion comprising at least two adjustment surfaces, wherein said at least two adjustment surfaces comprising a first adjustment surface and a second adjustment surface;

said body comprising at least two thicknesses of differing size, wherein said at least two thicknesses comprising a first thickness at said first adjustment surface and a second thickness at said second adjustment surface;

said body being configured to be inserted between a tree trunk and a strap device of a platform portion of a climbing tree stand in order to permit a hunter, upon the hunter being at a desired height on the tree trunk for hunting, to adjust the orientation of the platform portion with respect to the tree trunk, such that the platform portion is essentially level with respect to the ground or horizontal;

said elongated lowering device being configured to permit a hunter to lower said body by hand in between the tree trunk and the strap device; and each of said first and second adjustment surfaces being configured to be engaged by a portion of the strap device upon insertion of said body between the strap device and the tree trunk to permit a hunter to select a desired adjustment of the orientation of the platform portion corresponding to said first and second thicknesses.

14. The hunting tree stand adjustment device according to claim 13, wherein:

said hunting tree stand adjustment device comprises a securing device configured to secure said body of said hunting tree stand adjustment device to a portion of a climbing tree stand or a hunter;

said securing device comprises a strip-shaped structure; and said body comprises at least one opening formed therein configured to receive said strip-shaped structure.

15. The hunting tree stand adjustment device according to claim 13, wherein each of said first and second adjustment surfaces comprises a smooth, curved surface.

16. The hunting tree stand adjustment device according to claim 13, wherein:

said at least two adjustment surfaces comprise a third adjustment surface;

said at least two thicknesses comprise a third thickness at said third adjustment surface; and said first thickness is greater than said second thickness, and said second thickness is greater than said third thickness.

17. A method of using the hunting tree stand adjustment device according to claim 13, upon a hunter being at a desired height in a tree on a platform portion of a climbing tree stand that is not essentially level with respect to the ground or horizontal, said method comprising:

grasping said cord with one's hands and placing said wedge-shaped body adjacent the tree trunk with said contact surface facing the tree trunk;

selecting one of said first and second thicknesses that corresponds to the desired adjustment of a platform portion sufficient to place the platform portion essentially level with respect to the ground or horizontal;

creating space between a strap device of the platform portion and the tree trunk;

lowering, using said elongated lowering device, said body into the space between the strap device and the tree trunk;

stopping lowering of said body upon the strap device being aligned with said first or second adjustment surfaces that corresponds to the selected thickness; and moving the strap device into engagement with the selected one of said first or second adjustment surfaces, and thereby placing the platform portion in an adjusted position in which the platform portion is essentially level with respect to the ground or horizontal.

18. The method according to claim 17, wherein:

said hunting tree stand adjustment device comprises a securing device configured to secure said body of said hunting tree stand adjustment device to said seat portion or said platform portion or the hunter;

said securing device comprises a strip-shaped structure; and said body comprises at least one opening formed therein configured to receive said strip-shaped structure; and said method further comprises transporting said body of said hunting tree stand adjustment device while climbing the tree trunk by first securing, using said securing device, said body to a portion of a climbing tree stand or a hunter prior to climbing the tree trunk.

19. The method according to claim 17, wherein each of said first and second adjustment surface comprises a smooth, curved surface.

20. The method according to claim 17, wherein:

said at least two adjustment surfaces comprise a third adjustment surface;

said at least two thicknesses comprise a third thickness at said third adjustment surface;

said first thickness is greater than said second thickness, and said second thickness is greater than said third thickness; and said step of selecting one of said first and second thicknesses comprises selecting one of said first, second, and third thicknesses that corresponds to the desired adjustment of a platform portion sufficient to place the platform portion essentially level with respect to the ground or horizontal.

\* \* \* \* \*